Figure 1:
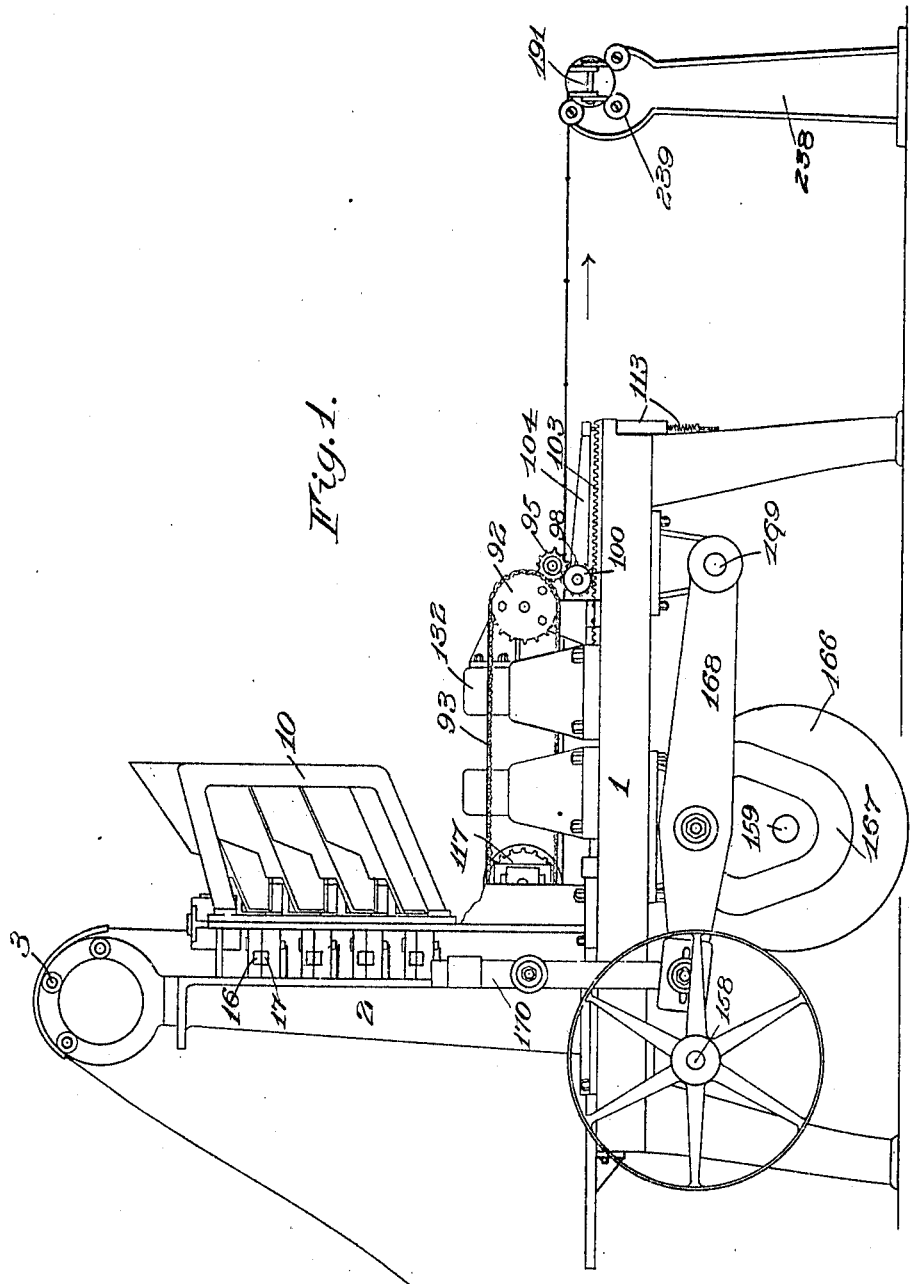

W. P. RANDALL.
MACHINE FOR MAKING WIRE FENCING.
APPLICATION FILED AUG. 30, 1906.

954,205.

Patented Apr. 5, 1910.
21 SHEETS—SHEET 2.

W. P. RANDALL.
MACHINE FOR MAKING WIRE FENCING.
APPLICATION FILED AUG. 30, 1906.

954,205.

Patented Apr. 5, 1910.
21 SHEETS—SHEET 3.

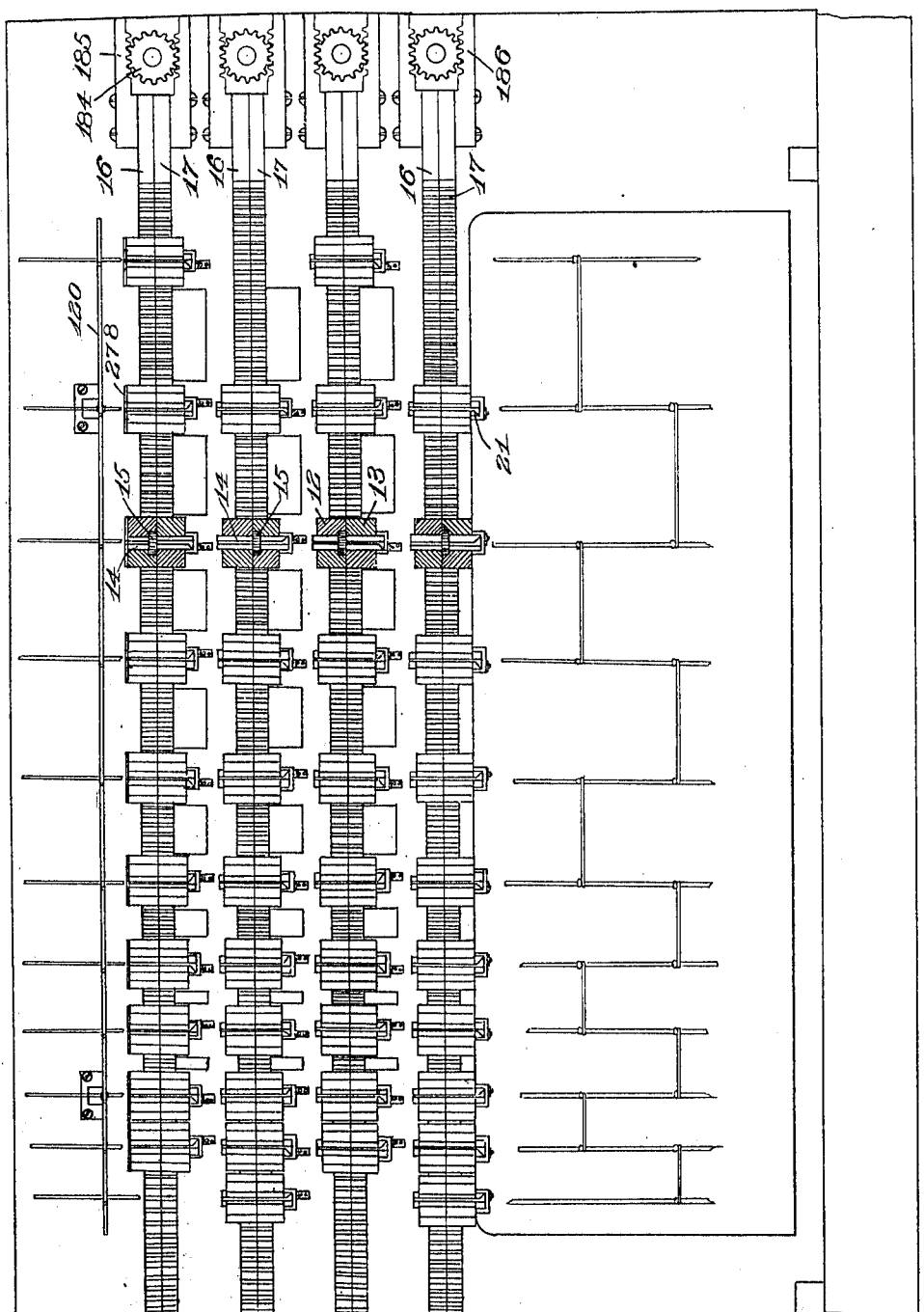

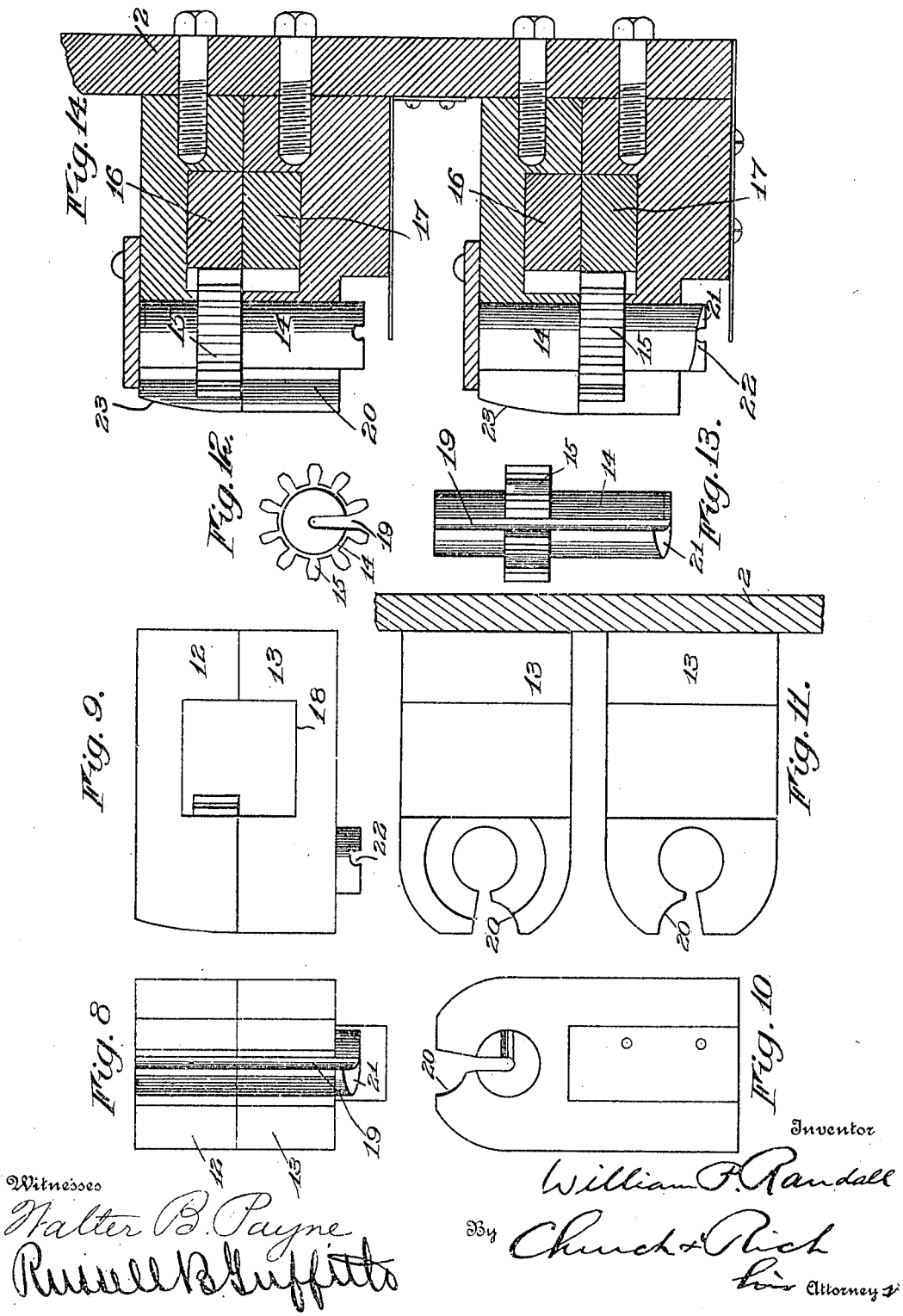

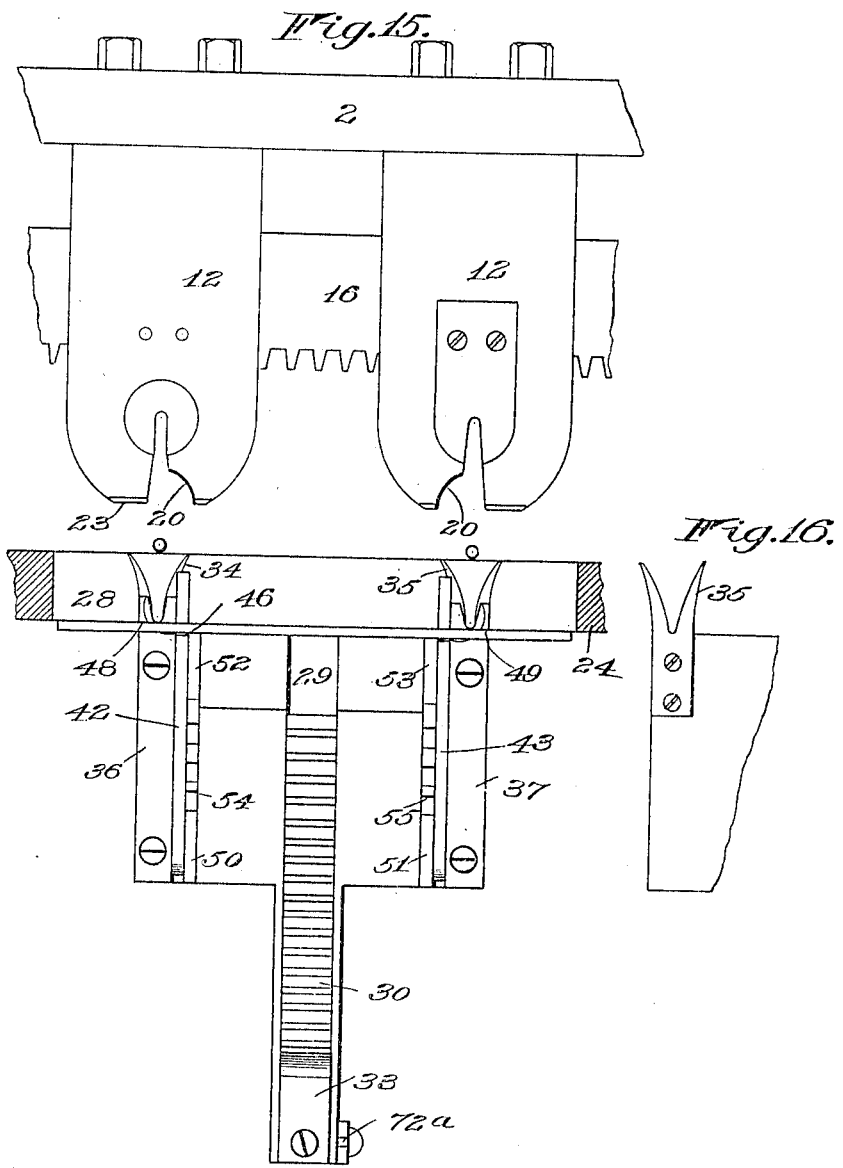

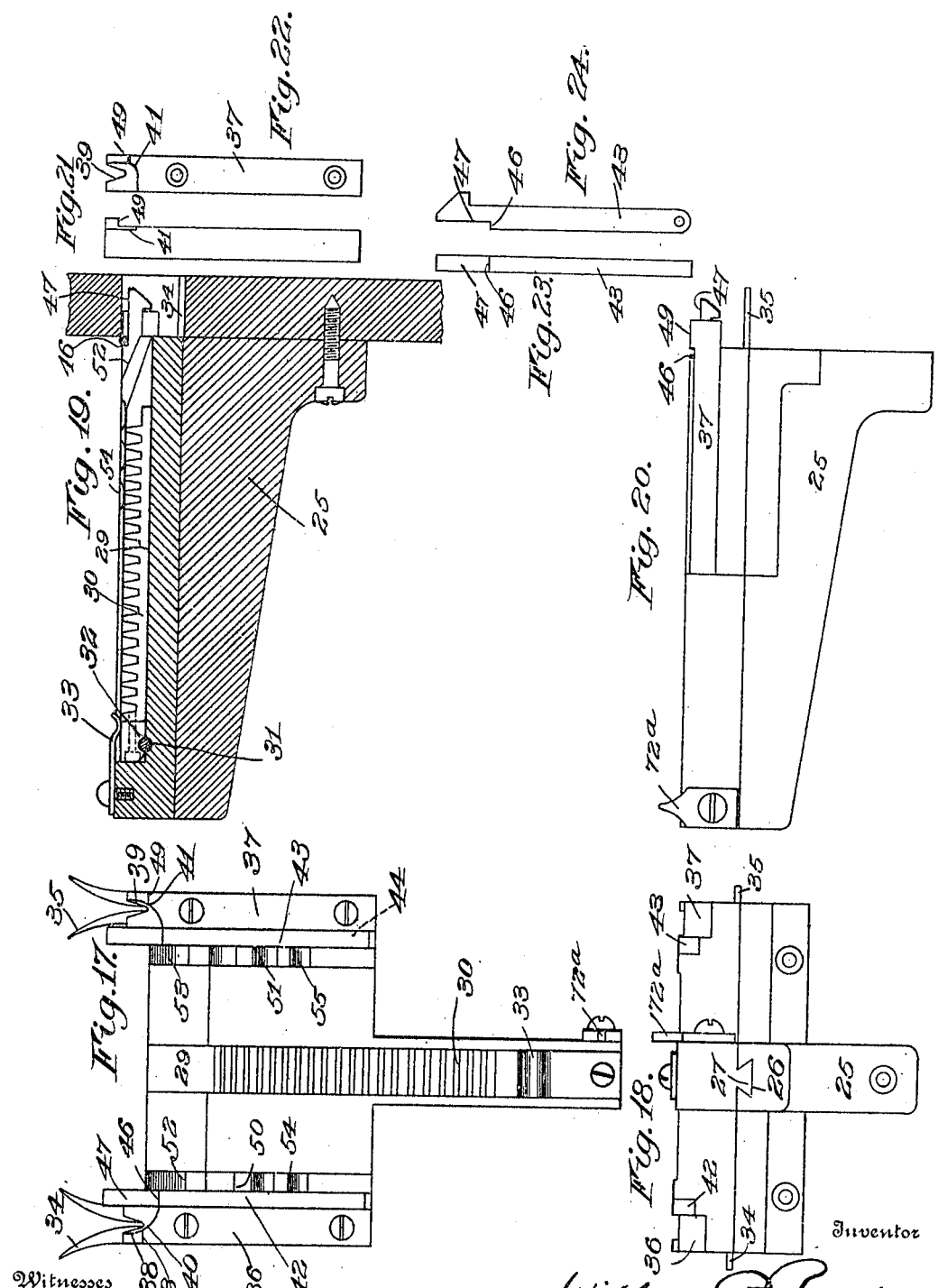

W. P. RANDALL.
MACHINE FOR MAKING WIRE FENCING.
APPLICATION FILED AUG. 30, 1906.
954,205.
Patented Apr. 5, 1910.
21 SHEETS—SHEET 10.
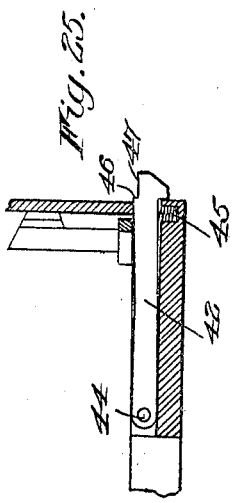
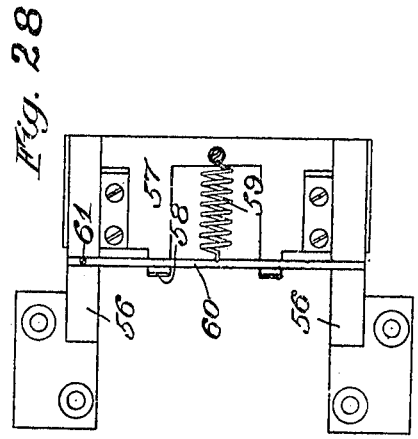
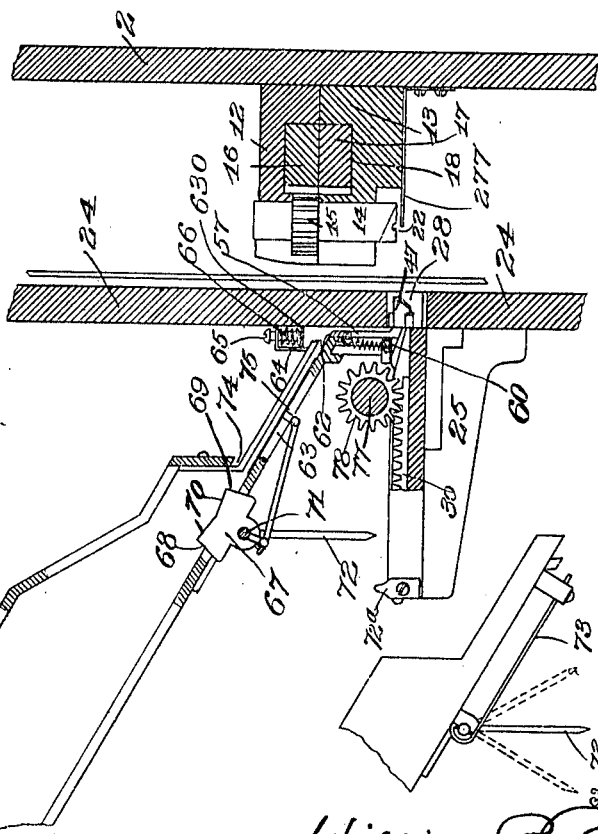

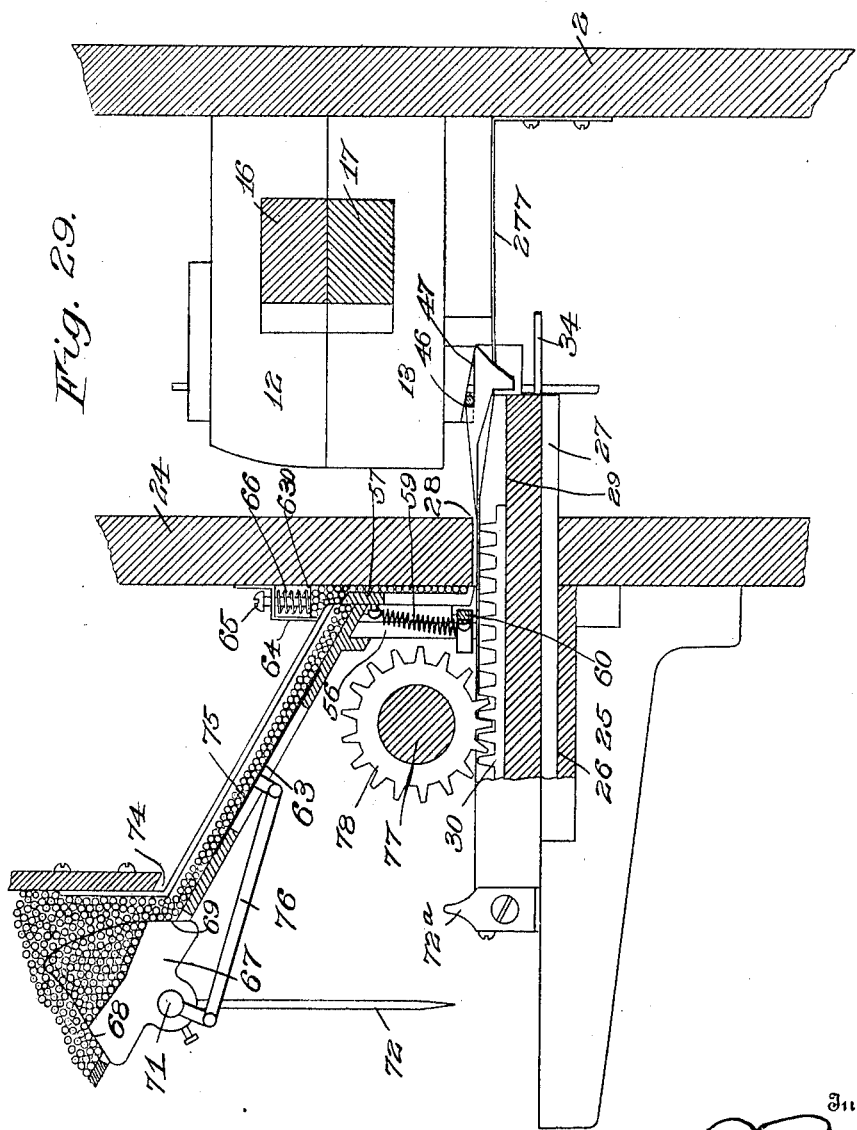

W. P. RANDALL.
MACHINE FOR MAKING WIRE FENCING.
APPLICATION FILED AUG. 30, 1906.
954,205.
Patented Apr. 5, 1910.
21 SHEETS—SHEET 13.
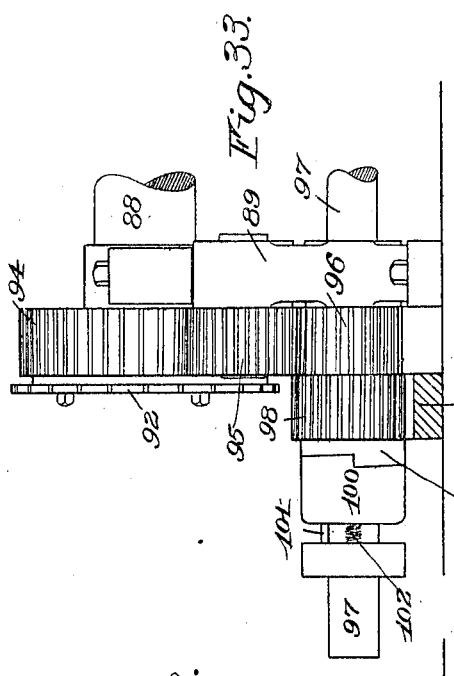
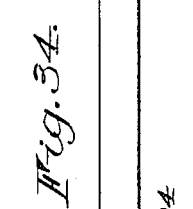
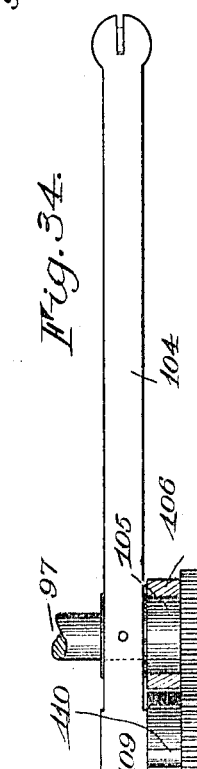
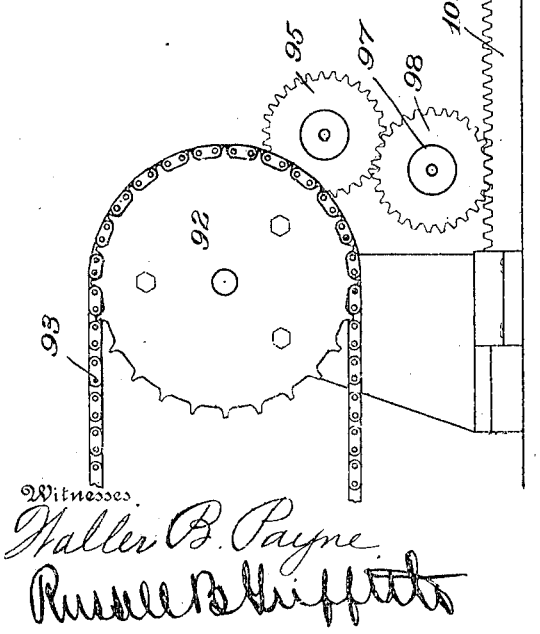
Witnesses
Walter B. Payne
Russell B. Griffith
Inventor
William P. Randall
By Church & Rich
his Attorneys W. P. RANDALL.
MACHINE FOR MAKING WIRE FENCING.
APPLICATION FILED AUG. 30, 1906.
954,205.
Patented Apr. 5, 1910.
21 SHEETS—SHEET 14.
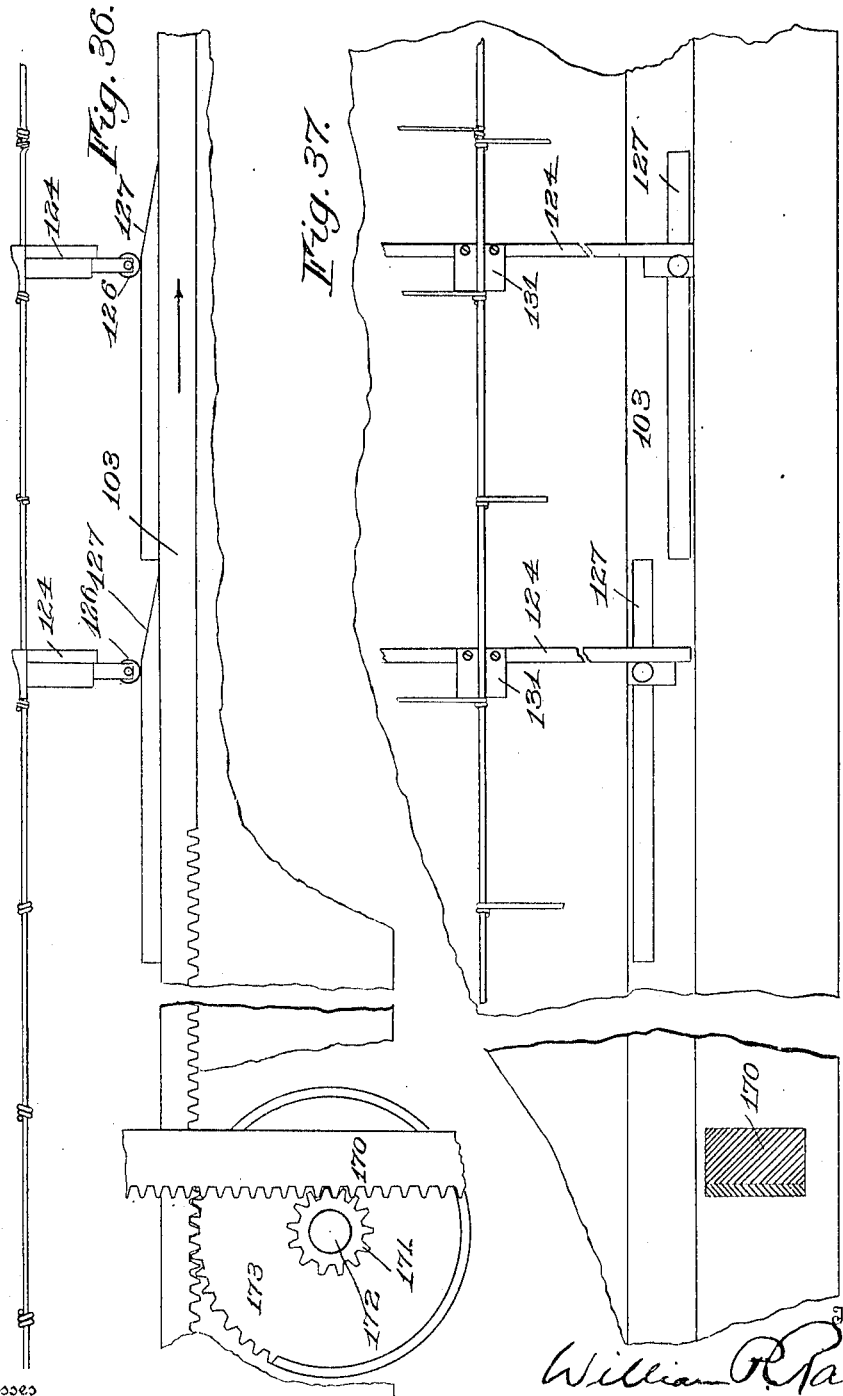

W. P. RANDALL.
MACHINE FOR MAKING WIRE FENCING.
APPLICATION FILED AUG. 30, 1906.
954,205.
Patented Apr. 5, 1910.
21 SHEETS—SHEET 15.
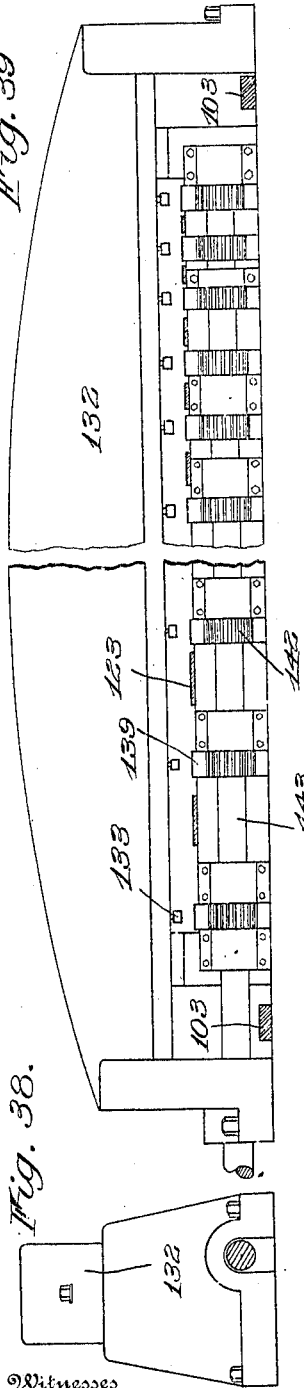
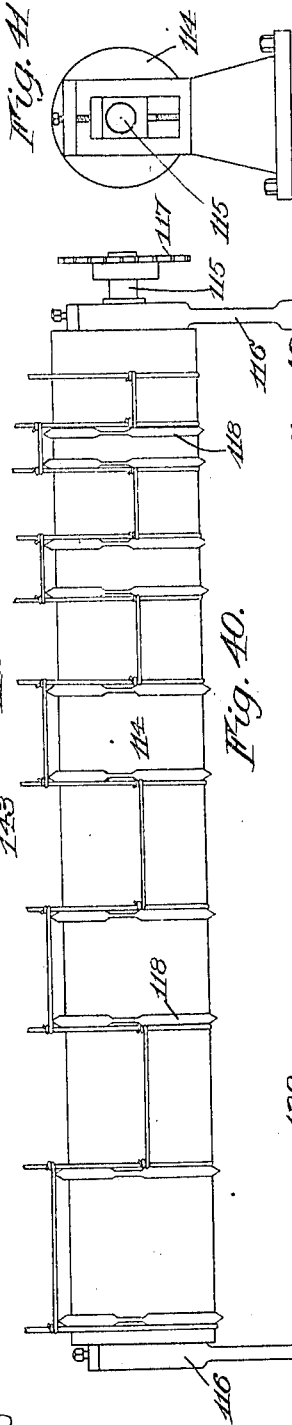
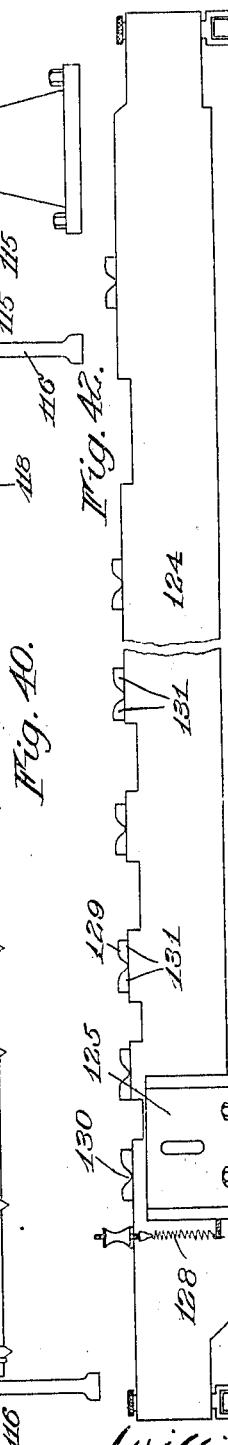
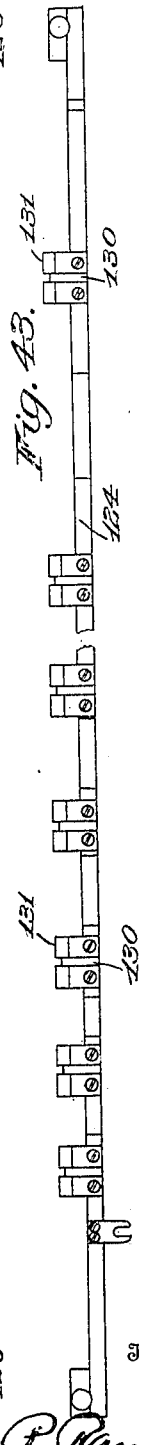

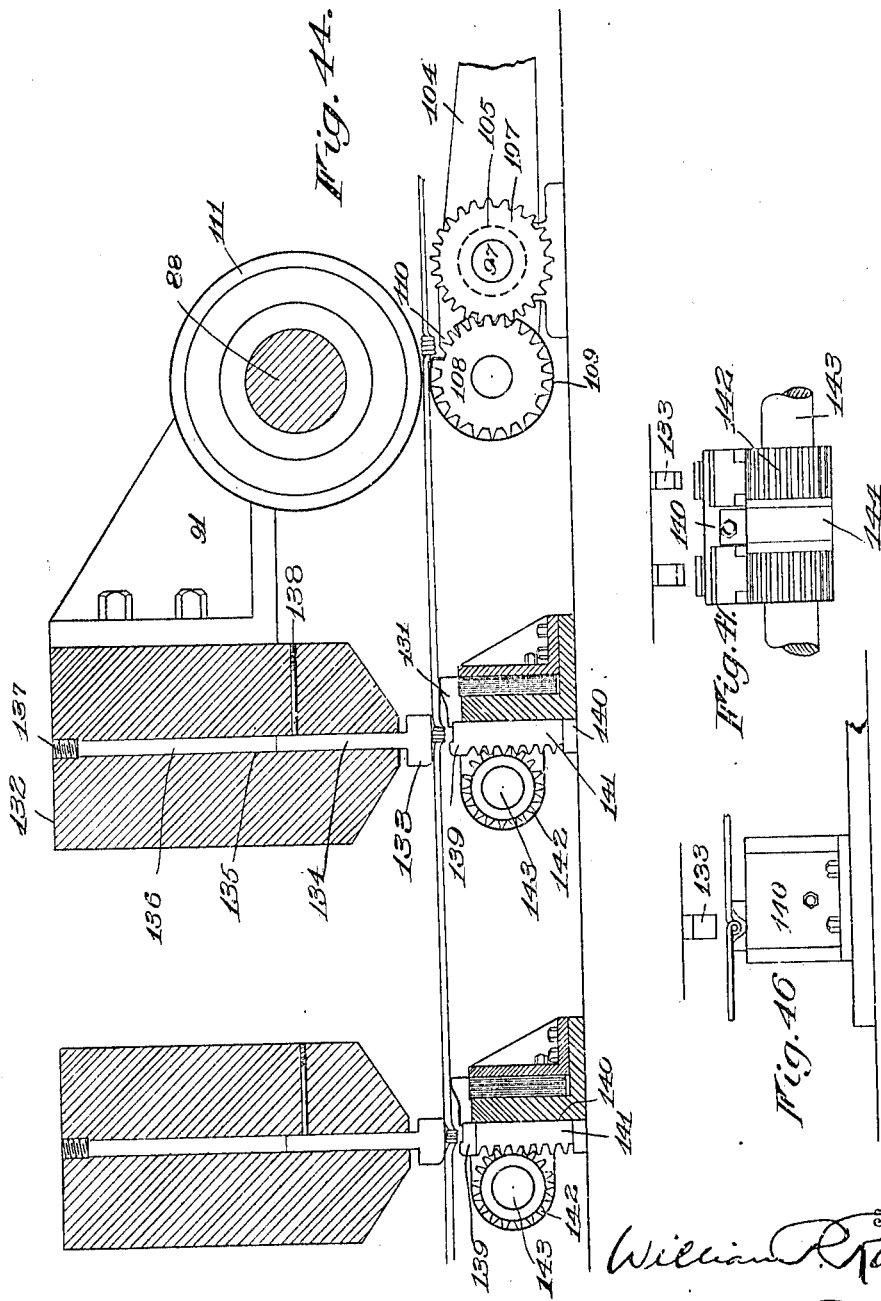

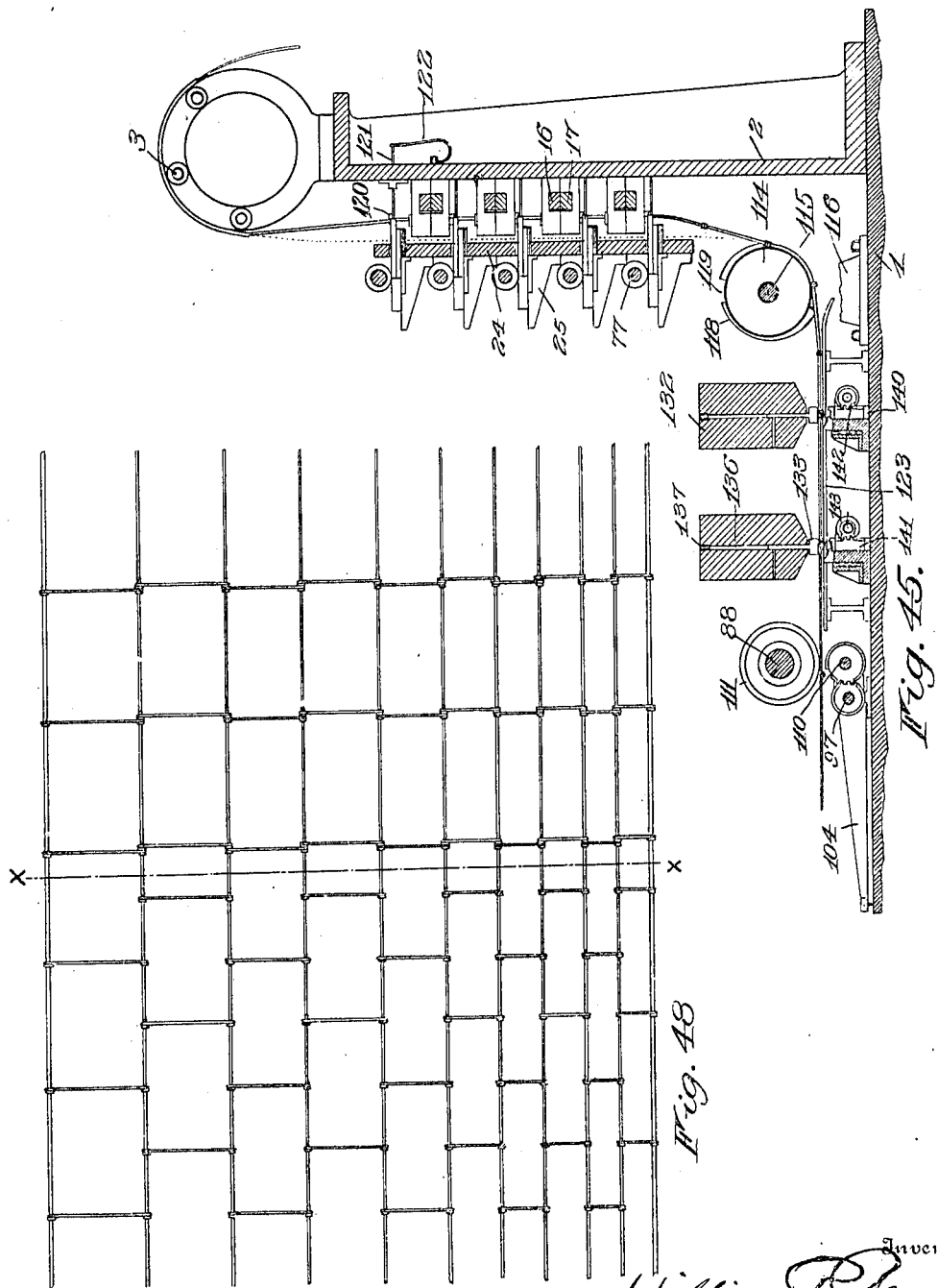

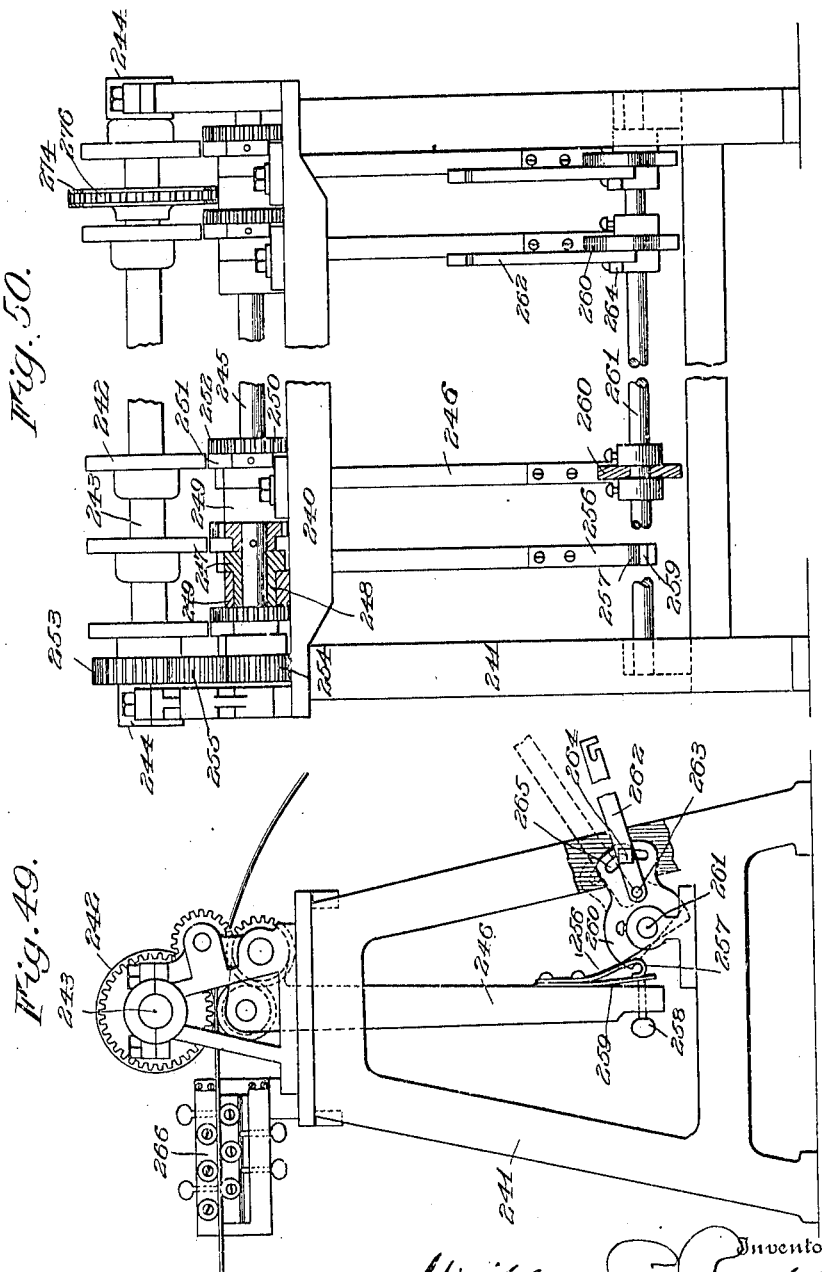

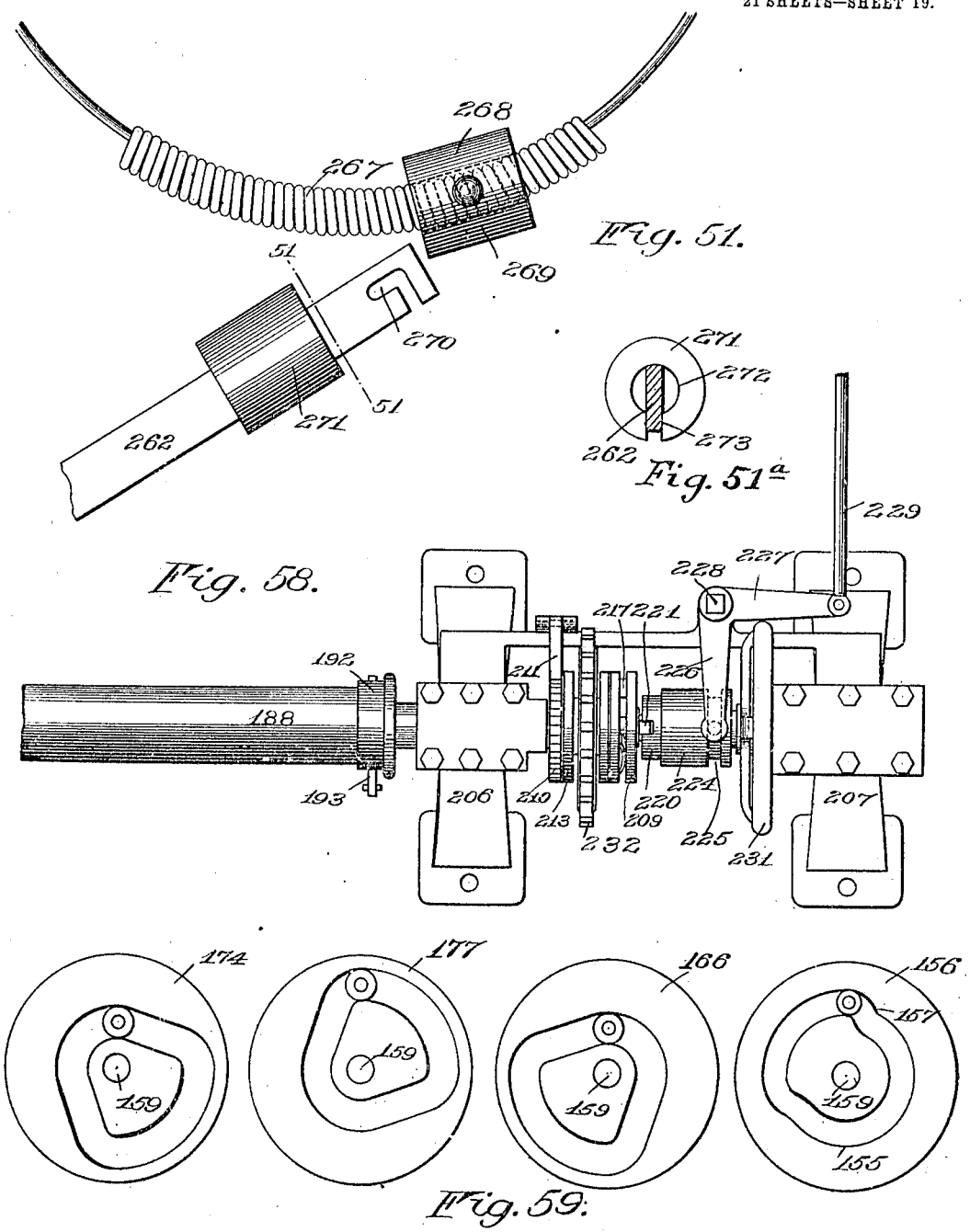

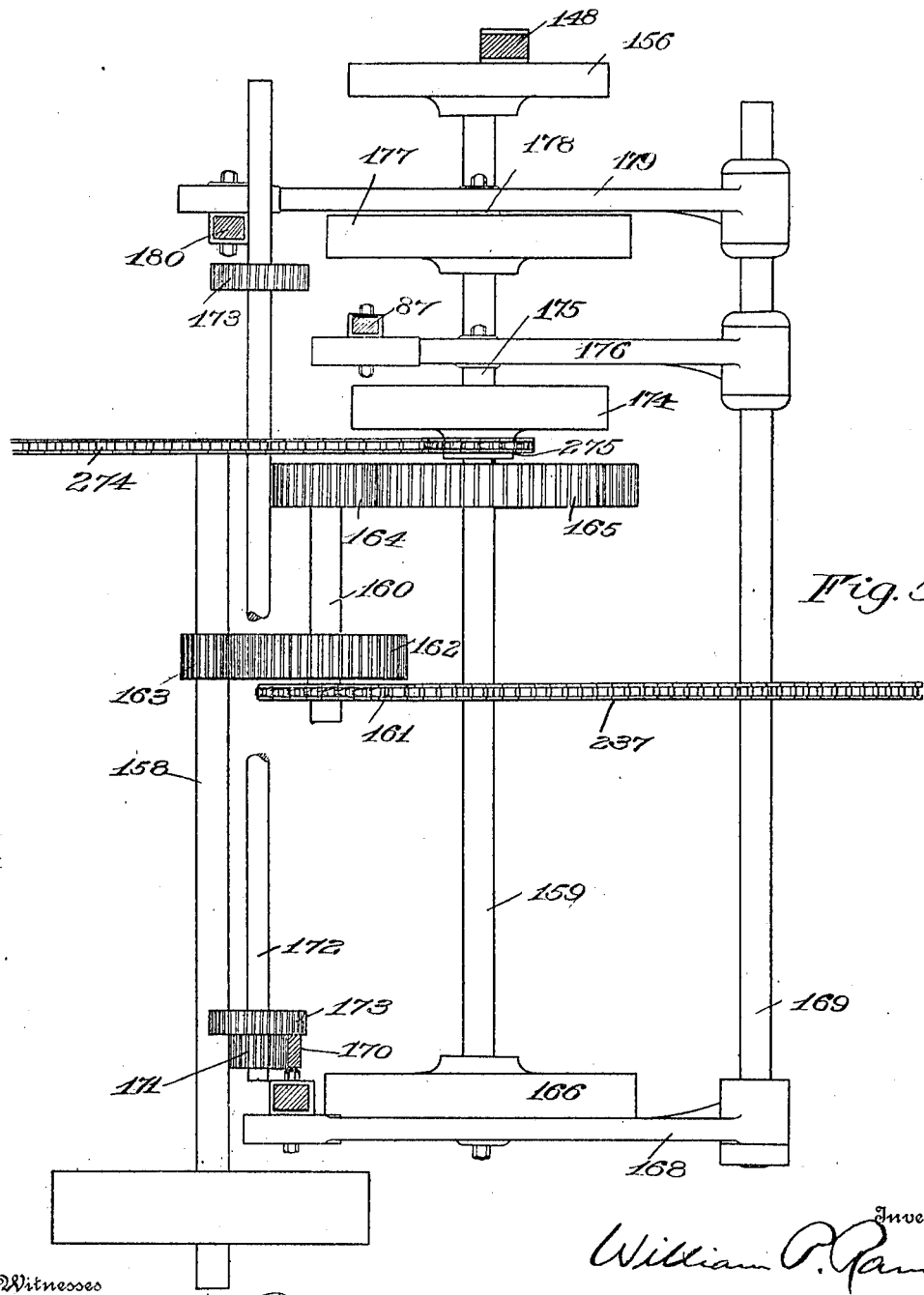

W. P. RANDALL.
MACHINE FOR MAKING WIRE FENCING.
APPLICATION FILED AUG. 30, 1906.
954,205.
Patented Apr. 5, 1910.
21 SHEETS—SHEET 21.
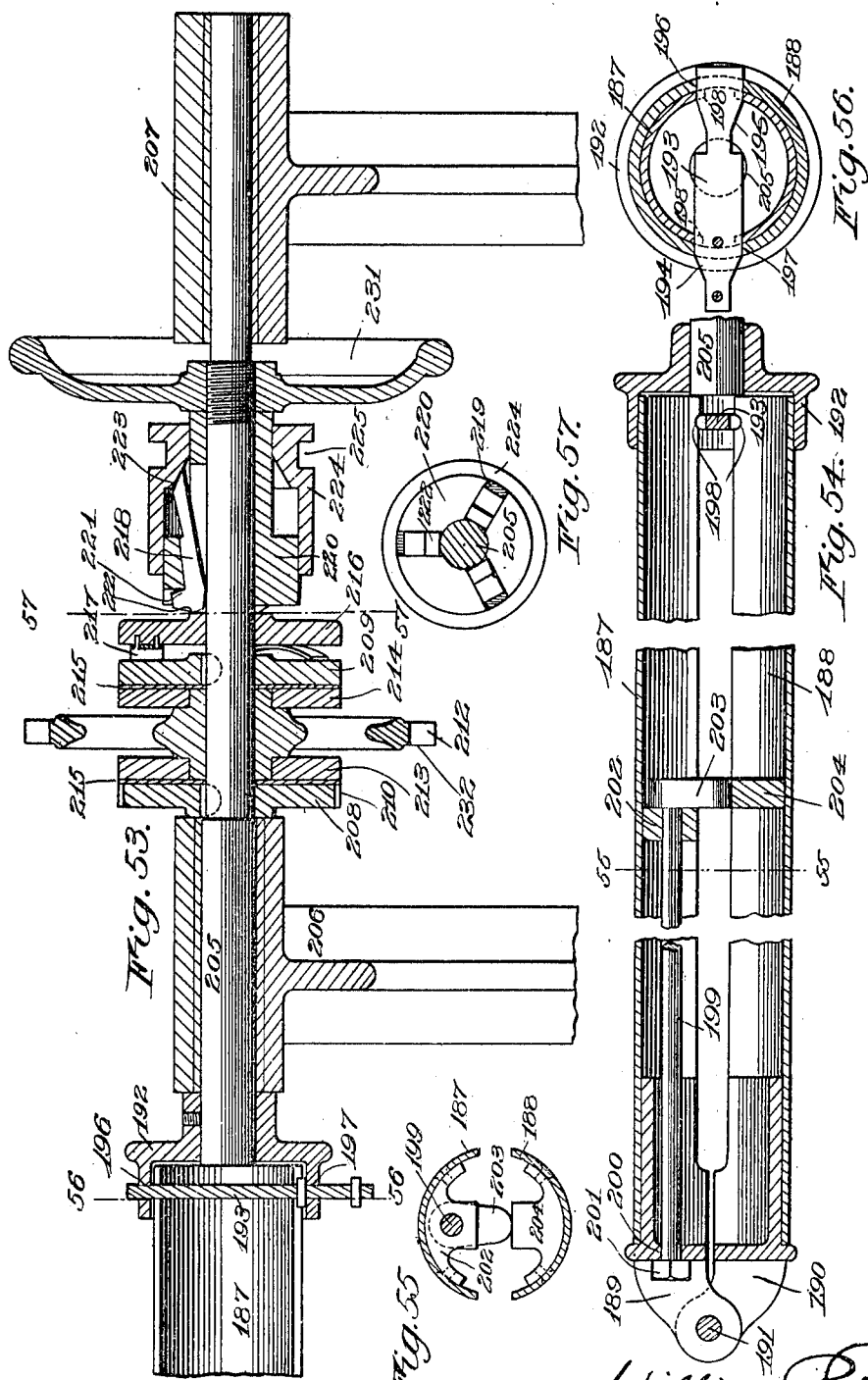

UNITED STATES PATENT OFFICE.

WILLIAM P. RANDALL, OF LE ROY, NEW YORK.

MACHINE FOR MAKING WIRE FENCING.

954,205.  Specification of Letters Patent.  Patented Apr. 5, 1910.

Application filed August 30, 1906. Serial No. 332,706.

*To all whom it may concern:*

Be it known that I, WILLIAM P. RANDALL, of Le Roy, in the county of Genesee and State of New York, have invented certain new and useful Improvements in Machines for Making Wire Fencing; and I do hereby declare the following to be a full, clear, and exact description of the same, reference being had to the accompanying drawings, forming a part of the specification, and to the reference-numerals marked thereon.

My present invention relates to improvements in the manufacture of wire fencing of the so called woven wire type, and has for its object to provide a machine capable of simultaneously applying a plurality of complete stay or cross wires to the strands during each period of time elapsing between the forward feed movements of the fabric, so that the capacity of the machine is increased over those types of machines heretofore constructed, wherein the cross or stay wires are applied by a series of progressive operations, or those in which a single cross wire is applied at each operation of the machine.

The present invention also dispenses with the use of wire supply reels such as have heretofore been used for feeding the cross wires to the machines, and by the elimination of these additional reels and the novel arrangements of the parts, the machine embodying my present invention occupies a minimum floor space, while the improved method of feeding and applying the cross wires to the strands and the feed and take-up devices for the fabric and the feed devices for the strand supply wire are positive and automatic in their operation, so that little attention is required on the part of the operator.

To these and other ends the invention consists in certain improvements and combinations of parts all as will be hereinafter more fully described, the novel features being pointed out in the claims at the end of the specification.

Figure 2:
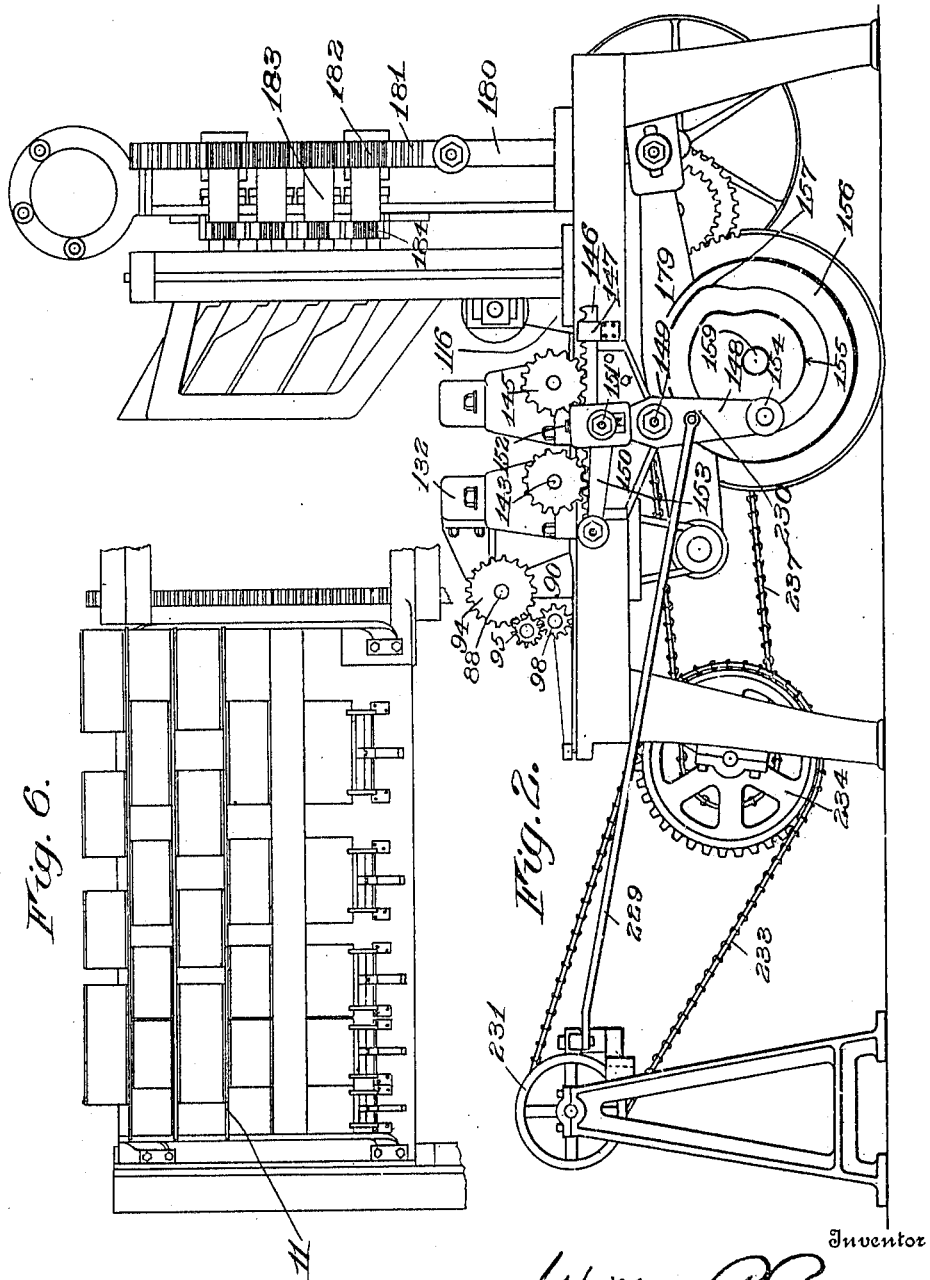
Figure 3:
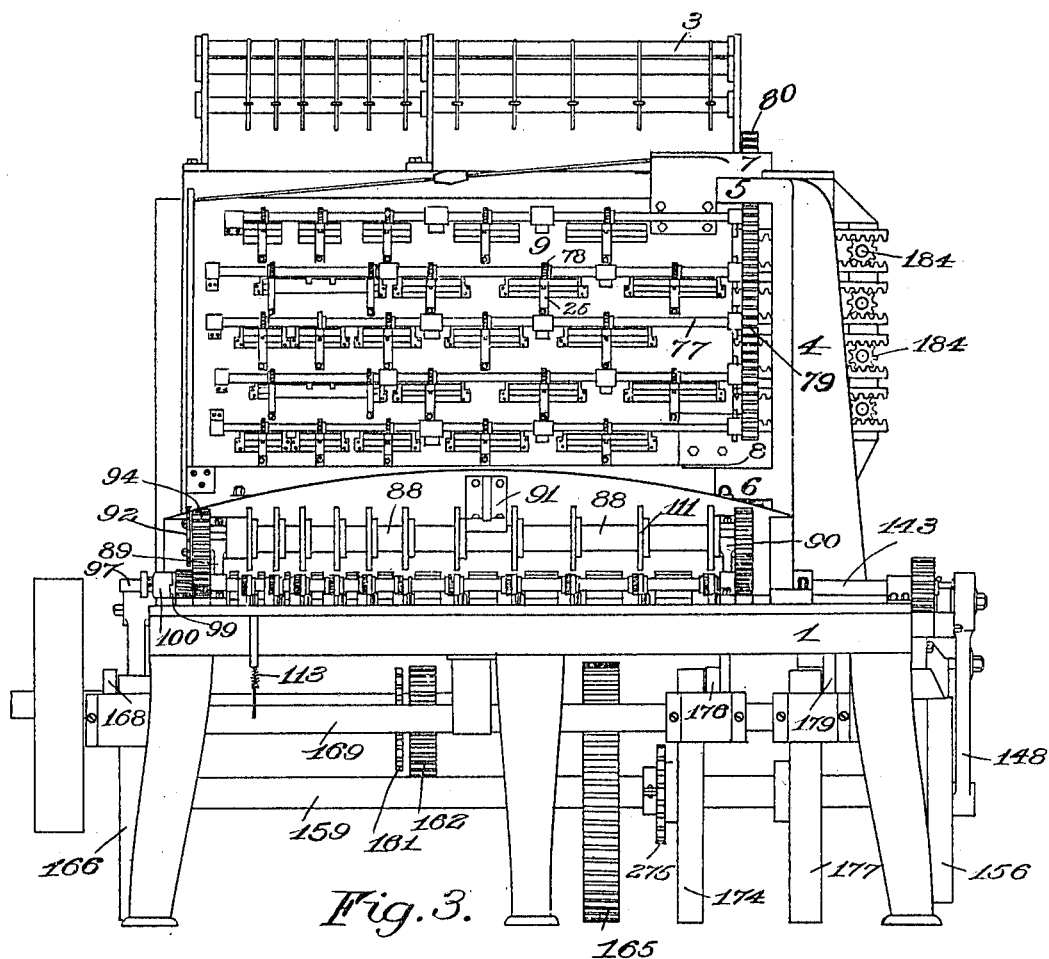
Figure 4:
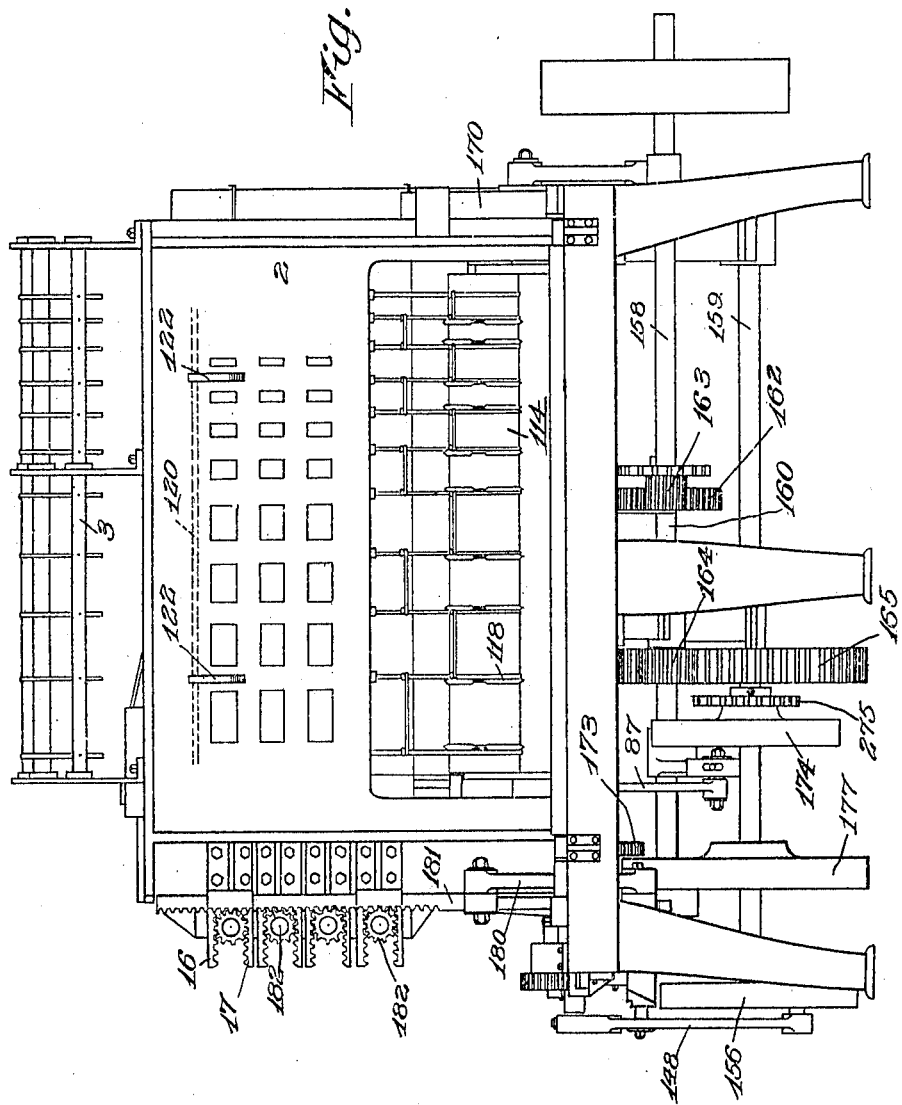
Figure 5:
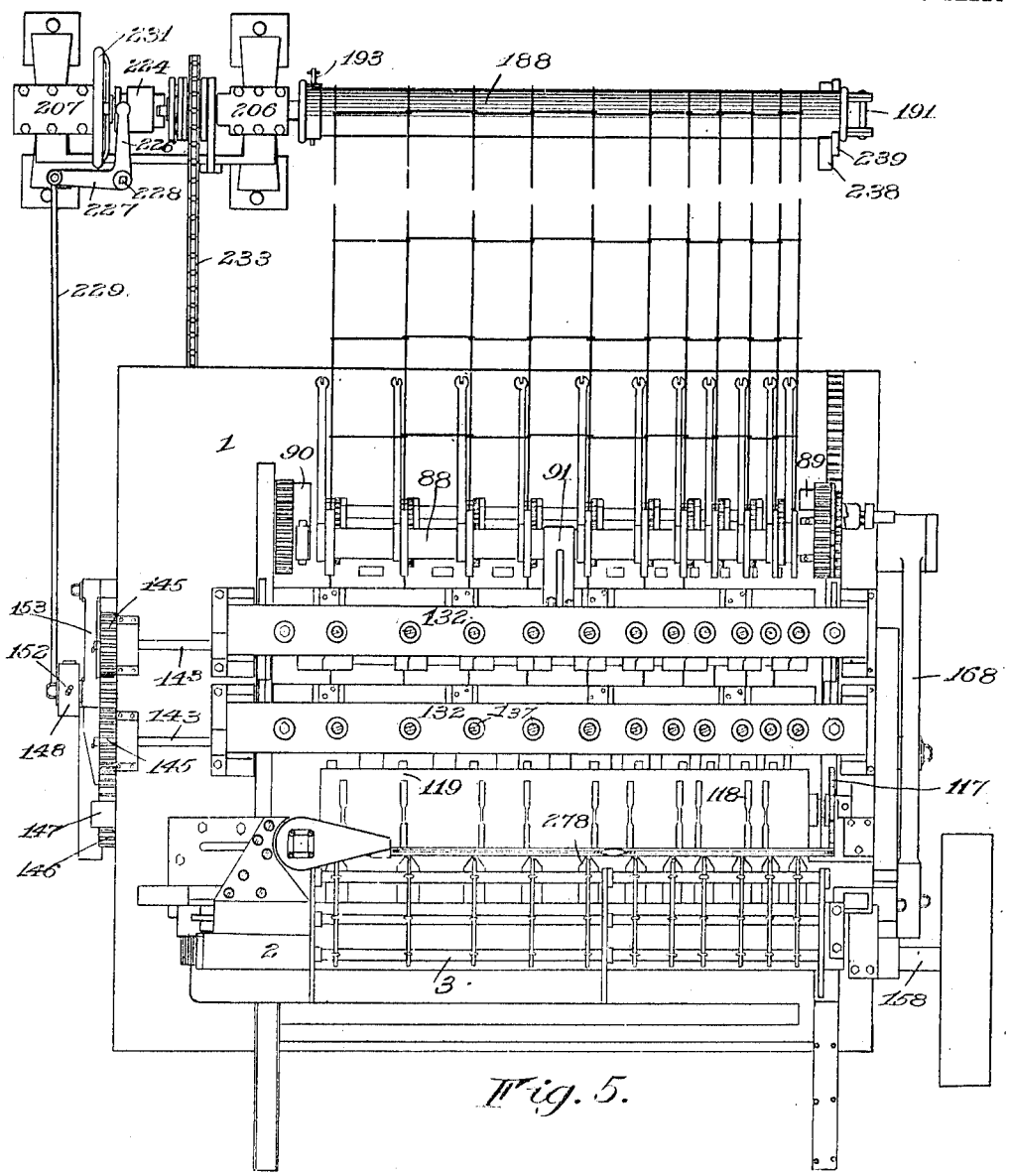
Figure 30:
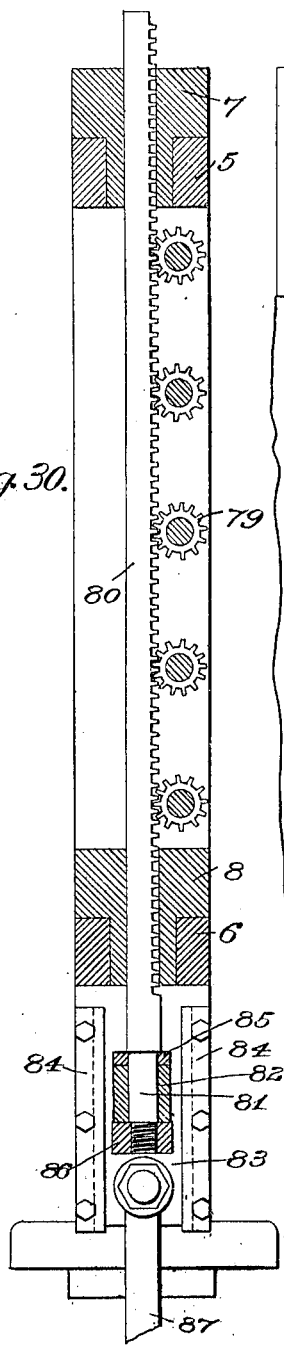
Figure 31:
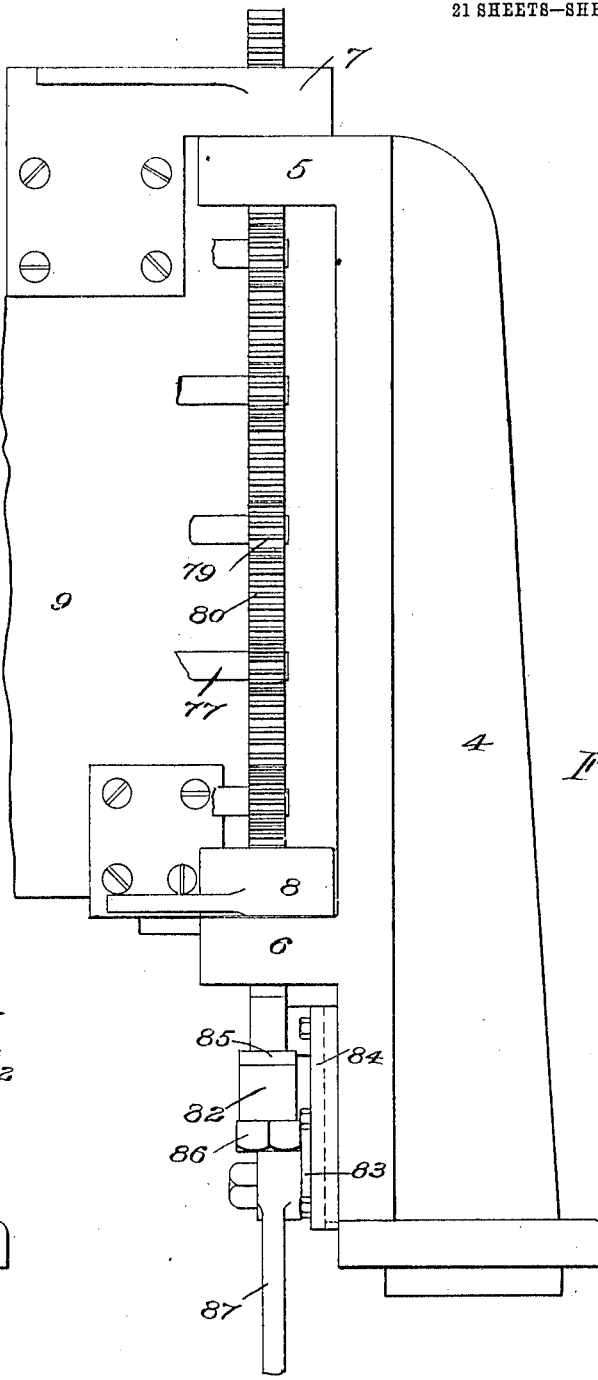

In the accompanying drawings: Figure 1 is a side elevation of a machine for making wire fencing in accordance with my present invention. Fig. 2 is an elevation of the opposite side of the machine. Fig. 3 is a front elevation of the machine with the cross wire supply hoppers removed. Fig. 4 represents a rear elevation of the fence-making machine. Fig. 5 is a top plan view thereof. Fig. 6 is a rear elevation of the cross wire supply hoppers and their hinged carriers, the latter being removed from the machine. Fig. 7 is a front view of the standard of the machine showing the sets of grouped winders, and their respective operating racks. Figs. 8 to 11 inclusive are detail views of the cross wire winders arranged within their housings. Figs. 12 and 13 are detail views of the winders removed from their housings. Fig. 14 represents a vertical section taken centrally through two adjacent vertically alined winders. Fig. 15 is a plan view of a pair of right and left-hand winders arranged in the same horizontal plane and adapted to operate on the opposite ends of the same cross wire, showing the coöperatively arranged cross wire feeding devices in readiness to guide and deflect the strand wires into axial alinement with the winders, and to supply a cross wire to the winders. Fig. 16 is a fragmentary view of a portion of the cross-wire feed showing one of the forks for locating the strand wire and guiding it into proper relation with the winders. Figs. 17 to 20 inclusive are detail views of the mechanism for feeding the cross wires from their supply hoppers to the winders. Figs. 21 and 22 are side elevation and plan views respectively of the rails removed from the cross wire slide. Figs. 23 and 24 are views in plan and side elevation respectively of the latches of the slide for transferring a cross wire from the supply hopper to the winders. Fig. 25 is a fragmentary view in section taken vertically through the transfer slide, showing the stop for limiting the upward movement of the latches. Fig. 26 is a fragmentary view showing the coöperative relation of the supply hopper and transfer slide and the feed-controlling devices between them, the transfer slide being shown in retracted position. Fig. 27 is a detail view of a portion of the hopper showing the agitating devices for the cross wires. Fig. 28 is a rear elevation of the feed plate for controlling the passage of cross wires between the supply hopper and the transfer plate. Fig. 29 is a view similar to Fig. 26, the transfer slide being shown in its forward position and the cross wire carried thereon in coöperative relation with the winders. Figs. 30 and 31 are detail views showing the operative connections between the driving mechanism of the machine and the transfer slides on the pivoted carrier. Figs. 32 and 33 are detail views of the main feed mechanism for intermittently advancing the fabric through the machine. Figs. 34 and 35 are detail views in plan and side elevation respectively, of the pressure members for the feed rolls. Fig. 35ª is a view of the parts shown in Fig. 35, viewed from the right. Figs. 36 and 37 are fragmentary views showing the strippers and their operating devices. Figs. 38 and 39 are detail views in end and side elevation respectively, of one of the presses. Figs. 40 and 41 are detail views of the guide roll for the fabric. Figs. 42 and 43 are detail views in side elevation and top plan showing the strippers. Fig. 44 is a detail view of that portion of the machine containing the strippers, the presses and the main feed devices for the fabric. Fig. 45 is a diagrammatic view showing the method in which the strand wires are passed through the machine, and illustrating the relative arrangement of the devices for stripping the cross wires into their proper locations, crimping or offsetting the strands to secure them in position, and the main feed rolls for advancing the fabric. Fig. 46 is a detail view showing a pair of the coöperating dies of the press as viewed from the rear. Fig. 47 is a detail view of the operating devices for the press dies. Fig. 48 is a diagram of the wire fencing such as may be made with a machine embodying my invention, that portion of the fence to the right of the line $x-x$ showing the arrangement of the cross wires in their permanent positions, while that portion to the left of this line shows the relative arrangement of the cross wires before they have been stripped into their proper positions. Fig. 49 is a side elevation of the improved strand feed devices and the tensioning and automatic controlling devices adapted to be employed between them and the intermittent feed machine for applying the cross wires. Fig. 50 is a detail view of the strand wire feed rolls in side elevation, and Fig. 51 is a view in detail of the tension spring and the detachable connection between it and the regulating lever. Fig. 51ª represents a section on the line 51—51 of Fig. 51. Fig. 52 is a plan view showing the arrangement of the operating mechanism of the machine. Fig. 53 is a central longitudinal section through the shaft for the take-up and winding drum showing the clutch for intermittently connecting and disconnecting it relatively to the operating mechanism of the machine. Fig. 54 is a longitudinal section of the takeup and winding drum. Figs. 55 and 56 are transverse sections through the drum on the lines 55—55 of Fig. 54 and 56—56 of Fig. 53, respectively. Fig. 57 represents a transverse section on the line 57—57 of Fig. 53. Fig. 58 is a plan view showing the takeup and winding clutch and its coöperating parts, and Fig. 59 is a diagram showing the relative timing of the cams for the main feed, transfer plates, winders and presses.

Similar reference numerals in the several figures indicate similar parts.

Machines for manufacturing wire fencing on the progressive principle, that is to say, those employing a set of separate reels for supplying the material for the cross wires to the different spaces between the strand wires, are comparatively slow in operation, as the aggregate number of cross wires applied and assembled at a single operation of the machine amounts to but one complete cross wire, and the use of a large number of reels for the cross wires in addition to those employed for the strand wires is objectionable, as they require considerable floor space and necessitate care and attention on the part of the operator.

My present invention provides a machine wherein it is preferable to supply the cross wires in convenient condition for the winders to apply them to the strand wires, the winders being so grouped that a plurality of rows of cross wires will be applied to the strands simultaneously, some of the cross wires thus applied, for the convenience in the grouping of the winders, being applied to the strand wires in temporary positions. As the partially completed fabric advances through the machine, all of the cross wires including those in temporary positions, will be stripped or slipped along into their proper relative positions on the strand wires where they are permanently secured from movement by the compressing action they receive from the presses.

In order to permit the operation of the winders and presses, the feed mechanism for the fabric advances the latter intermittently; that is to say, it operates only after the winders and presses have completed their respective operations. The take-up and winding drum is also set into operation intermittently, having an automatic clutch connection between it and the machine, and it coöperates with the main feed for the fabric to maintain the requisite tension on those portions of the strand wires passing through the machine, and it also assists in the feeding of the fabric.

As the supply wire for the strands is wound on revoluble reels, it is preferable to employ a continuously operating feed device for drawing the wire from the reels in such a way as to avoid jerks, and to provide automatic devices between these continuously-operating feed devices and the intermittently operating machine for controlling the movement of the strand wires from their respective reels into the machine.

A machine comprising the present embodiment of my invention consists, generally, of a bed or table 1 provided with suitable means of support, and having a standard 2 toward one end thereof and extending transversely across the bed, a series of cross bars 3 arranged preferably in an arc of a circle and forming guides for the passage of the strand wires over the top of the standard and down in front thereof so that the winders may apply the cross wires thereto. Adjacent to this standard is provided an upright hinge post 4, the latter being firmly secured to the bed and provided with hinge lugs 5 and 6 to coöperate with the corresponding hinge lugs 7 and 8 respectively, secured to a carrier 9, the latter being arranged to swing into and out of coöperative relation with the standard 2. This carrier forms a pivoted support for the cross wire supply hoppers, and the coöperating parts for transferring the cross wires from their hoppers to the winders, the carrier for this reason being provided at its rear with a suitable frame 10 having cross bars 11 to form shelves or racks to support the hoppers in coöperative relation with the cross wire transfer devices.

On the front of the standard 2 are arranged the grouped winders which serve to wrap the ends of the cross wires around the strands, and in the present embodiment of the invention four horizontal rows or sets of these winders are shown, making a total of twenty pairs, and these are adapted to simultaneously apply twenty individual stay wires to the strands, and in making a fence having eleven strand wires, these twenty individual stay wires, when assembled, will make two complete cross wires extending across the strand wires between the two outside or border strands. Each pair of winders is substantially a duplicate, and they may be constructed and operated in any desired way. In the present instance it will be seen, by referring to Figs. 8 to 14 inclusive, that each winder is inclosed in a housing composed of a pair of sections 12 and 13, suitably secured together and to their supporting upright 2, and these housings form journal bearings for the winders 14, the latter having pinions 15 thereon arranged to coöperate with either one of the racks 16 or 17, the pinion of one winder of the pair coöperating with one of the racks, while the other winder of the same pair coöperates with the other rack, and these racks are mounted one above the other and extend through apertures 18 formed in the housings of the winders and serve as supports and guides therefor in their movements. These winders each embody a cylindrical portion which serves as a journal, and they are provided with a radial slot 19, which extends from the periphery of the cylinder at a point between two adjacent teeth on the pinion inwardly to a point slightly beyond the axial center thereof for the purpose of permitting the strand wire to enter this slot and occupy a position coincident with the axis of rotation of the winder. The housing for each winder is provided with a slot in its end arranged to register with the radial slot in the winder when the latter occupies its normal position so that the strand wire may pass through the slots of the housing and the winder when the latter are in register.

During the operation of the machine, the winders of each pair revolve in opposite directions to wind the stay wires about their corresponding strands, and the latter, during this operation, are in line with the axes of their respective winders, but when the winding operation has been completed, these strands are disengaged from the winders before they reverse their movement, and, in order to avoid a possibility of any of the strand wires returning into the winders during the reverse movement of the latter, it is preferable to cut away the material of the housing at one side of the opening leading to the winder to form a deflecting surface 20 that will receive the strand wire after it has been struck by the pinion and cast aside and clear of the housing and its winders. These winders are grouped in pairs and spaced at distances corresponding to the distances between the strand wires of the fencing, and in order to enable them to take hold of the opposite ends of the cross wire, suitably fed to them, and wind it around the corresponding strand wires, the lower end of the cylindrical portion of each winder is formed on a spiral about the axis of the winder as a center, and this spiral surface serves as a cam 21 having a cross wire engaging hook 22 formed at the lowermost point of the cam. The spiral surface has its pitch arranged in opposite relation on the winders of each pair, so that the ends of a cross wire resting against the hooks on the respective winders will be wound in opposite directions about the strand wires extending through the axes of their respective winders, the spiral cam surface coöperating with the corresponding end of the cross wire as it is being formed into a coil and serving to slide the latter along the strand wire in order to accommodate the succeeding convolutions of a cross wire as they are wound along the strand.

In order to facilitate the shedding operation, that will be hereinafter more fully described, it is preferable to bevel the upper exposed edges of the winder housings as shown at 23 in Fig. 14, as this precludes the possibility of the catching of the cross wires that have been previously applied to the strands as they pass the winders.

*Cross wire feed mechanism.*—The mechanism for supplying the cross wires to the winders is mounted on and bodily movable with the pivoted carrier 9, the latter having a front plate 24 which stands opposite to the winders on the stationary standard, a sufficient space being left between the winders and this plate to permit the passage of the fabric as it is advanced by the feed rolls. This plate is provided with a series of apertures, one for each pair of winders, these apertures being arranged to correspond with the positions occupied by their respective pairs of winders so that slides may pass the cross wires from the hoppers directly through this plate and into operative position beneath the winders.

In the present embodiment of the invention I have shown a transfer slide for carrying the cross wires one at a time between the supply hopper and the winders, as a feed of this kind is reliable in operation and not liable to become obstructed. This slide may be conveniently supported on the carrier by a bracket 25, secured to the plate 24 and provided in the present instance with a dove-tailed groove 26 to receive a correspondingly-formed rib 27 on the transfer slide, the latter being guided by this bracket so as to reciprocate through the aperture 28 in the front plate, and to deliver a cross wire to the corresponding pair of winders at each reciprocation. This slide is provided with a longitudinal groove 29 to receive a rack 30, the latter when suitably connected to the slide serving to operate the latter, and when it is disconnected therefrom, it will permit relative movement between the rack and the slide, and by providing a suitable attachment between the rack and slide, the latter may be readily removed and replaced while this attachment is disconnected. Any suitable means may be employed for attaching the slide and rack in operative position, an automatic latch being shown in the present instance which may be engaged and disengaged by exerting sufficient force between the rack and the slide in the direction of their movement, so that this automatic latch may be utilized as an automatic safety device to throw its corresponding slide out of operation should a cross wire possibly jam. This latching connection in the present instance is formed by the shoulder 31 projecting from the bottom of the rack receiving groove of the slide and adapted to engage in a corresponding recess 32 in the bottom of the rack, this shoulder and groove being normally held in coöperative relation by a spring 33. At the sides of the slide and projecting backwardly therefrom are a pair of forks 34 and 35 respectively, which are spaced to correspond with the distance between the strand wires to which this slide is to supply the cross wires, these forks having their sides or arms widened at their forward ends so as to locate the strand wire in case it should be deflected laterally, and narrowed toward their rear to approximately the thickness of the strand wire, so that as the slide is moved forwardly, the strand wires will be automatically centered in the narrow portions of the forks, and the latter will carry them into the slots or passages formed in the winders and their housings, as will be hereinafter more fully described.

At the sides of the slide are provided a pair of rails 36 and 37 having slots 38 and 39 formed therein in alinement with the strand seats in the forks, and the upper inner surfaces of these rails are recessed to a depth corresponding to the thickness of the cross wire, as at 40 and 41, and these recesses serve to receive the lowermost convolutions of the cross wire as the last convolution is formed. At the inner sides of these rails are provided a pair of latches 42 and 43, the latter being pivoted at 44 in recesses in the slide, a spring 45 arranged between the slide and the latches serving to normally press them upwardly. Each of these latches is provided with a shoulder 46 formed therein a short distance from its forward end, and leaving a recess or depression 47 of a depth corresponding to the diameter of the cross wire to be fed. On the backward ends of the outer rails 36 and 37 are provided the shoulders 48 and 49, these shoulders being spaced backwardly of the corresponding shoulders on the latches a distance just sufficient to accommodate a cross wire between them, as shown in Fig. 16. On the slide between these latches a pair of cam tracks 50 and 51 are provided, these tracks being fixed to the slide and provided at their backward ends with inclined cam surfaces 52 and 53, and having the undulating surfaces 54 and 55 extending in rear thereof.

Mounted at the front side of the plate 24 are a pair of guides 56 which serve to support a vertically reciprocatory feed plate 57, the latter having ledges or feet 58 thereon projecting backwardly and adapted to support a column of cross wires on their upper side, while their under surfaces are arranged to coöperate with the cam tracks 54 and 55, a spring 59 attached to the feed plate and connected to the cross rail 60 normally tending to move the feed plate downwardly and serving to hold it in coöperative relation with the cam surfaces on the cam track. This guide is provided with a set screw 61, which, when tightened, engages the feed plate and holds it in elevated position, and this may be employed for temporarily interrupting the feed of the cross wires between the hopper and the transfer slide. This feed plate has its backward surface spaced from the front surface of the plate 24 a sufficient distance to permit the passage of a single row or column of cross wires, which as previously stated, are supported by the ledges or feet at the bottom of the plate, and when the slide is in retracted position, as shown in Fig. 26, the cam surfaces 52 and 53 will permit this plate to lower a sufficient distance to permit the passage of a cross wire between the ledge and the adjacent edge of the plate 24 at the upper corner of the aperture 28 through which the cam slide operates.

The upper edge of the feed plate 57 is provided with a bevel 62 having an incline corresponding to the runway 63 leading from the hopper, and when the feed plate is in lowered position and the transfer slide is retracted, this bevel edge will form a continuation of the upper surface of the runway 63 as shown in Fig. 26, and this will permit free passage of the cross wires from the runway to the space between the feed plate and the stationary plate 24, but when the transfer slide is moved backwardly, the upper edge of the feed plate will be elevated above the runway, thereby serving as a cut-off to stop the flow of the cross wires from the hopper.

Above the feed plate and in alinement therewith is preferably provided a yielding follower or buffer for maintaining a yielding pressure on the cross wires that are under the control of the feed plate, such a device being shown in the present instance as comprising a follower plate 630 mounted to operate in guides 64 and having plungers 65 thereon for guiding it in its movement, springs 66 encircling these plungers between the follower and the guides and serving to press the follower downwardly against the cross wires with a yielding pressure, and this will compensate for the cross wires that are displaced when the feed plate rises to cut them off from the hopper, so as to avoid excessive pressure on the feed wires, and when the feed plate lowers, the spring pressed follower will force the cross wires down with it so as to avoid the possibility of their clogging or sticking.

Any suitable type of hoppers may be employed for containing the cross wires, although it is preferable in the present instance to employ hoppers corresponding substantially in width to the length of the cross wires to be used, and it is preferable to leave sight apertures in the bottoms of the hoppers in order to permit visual inspection from time to time. These hoppers are inclined at a suitable angle to insure their feeding to the runway 63 which forms a continuation to the lower end of the hopper, and it is preferable to employ a suitable agitating device that will keep the wires in motion and prevent bridging or crossing of the wires. A device of this kind is employed in the present instance, and by referring to Figs. 26 and 29 the construction and operation may be understood. It consists of a pair of spaced oscillatory blades 67 extending through slots at the bottom of the hopper and provided with the oppositely inclined edges 70. These blades are fixed to a shaft 71 mounted in suitable brackets on the bottom of the hopper, and the shaft is provided with a depending operating arm 72, springs 73 serving to normally hold the operating arm in vertical position. On the transfer slide is provided an operating projection 72ª arranged in line with the lower end of the operating arm for the agitator and adapted to swing the latter alternately into positions indicated by dotted lines in Fig. 27, as the slide is advanced and retracted.

By referring to Fig. 29 it will be seen that the forward or upper edge 68 of the agitating plates serves as a shoulder or abutment for sustaining the inclined row of cross wires resting on the hopper bottom, while the lower edge 69 stands opposite to the discharge opening 74 of the hopper, and at the entrance of the restricted runway 63, so that the oscillations of the agitator plates will keep the wires at the entrance to the runway in constant motion to prevent their clogging or bridging as they discharge from the hopper. As the slide moves backwardly the operating arm 72 of the agitator will also swing backwardly until it automatically trips by reason of its movement in the arc of a circle, and the backward swinging of this arm will lower the upper edge of the blades 67 and permit the wires in front of it to pass over the agitator blades, and as the transfer slide is retracted, it will again engage this agitator arm to swing it forwardly, and this will cause the upper inclined edges 70 of the agitator blades to tilt and spill the wires into position to enter the runway, and as this agitator operates at each stroke of the transfer slide, the cross wires at the upper opening of the runway will be constantly kept in a state of agitation. Should any of the cross wires become disarranged before reaching the agitator blades, they will be rearranged at the proper angle when they strike the upper edges 68 thereof, the agitator acting as an escapement movement for permitting the passage of the wire step by step. In order to further insure certainty of feed of the cross wires to the strand wires, I prefer to employ an additional agitating medium in the form of a plate 75 mounted in the bottom of the runway and arranged to reciprocate longitudinally thereof, so that as this plate operates it will have rolling engagement with the cross wires, thus keeping them in a constant state of movement. This agitating plate in the runway may be conveniently operated by means of the connecting rod 76 having a crank connection with the shaft 71 of the main agitator of the hopper.

Each horizontal row of transfer slides is operated by a shaft 77, suitably journaled on the hopper carrier in rear of the plate 24 thereof, a pinion 78 being provided on this shaft and arranged to mesh with the rack 30 of each slide so that as this shaft is rotated, it will simultaneously operate all of the slides in that row. One of these shafts 77 is provided for each row of slides as before stated, and they are provided on their ends with pinions 79 arranged to mesh with a reciprocatory rack 80, the latter being mounted to operate axially in the hinge lugs 7 and 8 of the hopper carrier, and the lower end of this rack has a journal portion 81 fitted in a knuckle 82 formed on a cross head 83, the latter being mounted to slide vertically between the guides 84, secured on the hinge post 4. This arrangement permits relative rotary movement between the cross-head and the rack which is on the pivoted carrier so that these parts will remain operatively connected irrespective of the relative position of the hopper door or carrier on its hinges, a collar 85 engaging between a shoulder on the rack and one side of the knuckle on the cross-head and a nut 86 on the rack engaging the opposite side of the knuckle of the cross-head to connect the cross-head and rack for relative longitudinal movement, the cross head being provided with a connecting rod 87 by means of which it is reciprocated.

*Main feed mechanism for the fence.*— Arranged on the top of the bed and extending transversely thereof are the feed rolls for intermittently advancing the fabric as the different operations thereon are performed. These feed rolls are arranged in pairs, one above the other, and corresponding in number to the number of strands used in the manufacture of the fence, the upper rollers being mounted on a shaft 88, journaled at opposite ends in bearing standards 89 and 90 and having an intermediate bearing 91 for reinforcing them at the center, the shaft 88 having a sprocket wheel 92 thereon to receive a chain 93, and being also provided with a gear wheel 94, meshing with an idler wheel 95, and the latter in turn meshing with a pinion 96 fixed to an operating shaft 97 for the lower rollers, and adjacent to the pinion 96 is arranged a pinion 98 mounted loosely on the shaft 97 and having a clutch member 99 arranged to coöperate as a ratchet, with the clutch member 100 having a key 101 for permitting relative axial movement thereof on the shaft, and serving to transmit rotary movement between the pinion 98 and the shaft when the pinion is rotated in one direction, the spring 102 serving to hold these clutch members in coöperative relation. This pinion 98 meshes with a reciprocatory rack 103 which is operable longitudinally on top of the bed, the clutch members serving to rotate the shaft 97, and through the gears 95 and 94 the shaft 88 for the upper feed rolls as the rack is operated in one direction, and serving to permit return movement of the rack while the feed rolls remain at rest. The lower operating shaft 97 extends through the pivotal axes of a set of feed roll adjusting levers 104, the latter being each provided with a hub 105 to receive this shaft, and this hub in turn fitting a bearing 106, secured to the bed of the machine, and serving as a firm support to sustain the reaction on the lever produced by the pressure exerted between the feed rolls. On the shaft 97 adjacent to each lever is fixed a pinion 107 arranged to mesh with a corresponding pinion 108, the latter being journaled on the work end of the lever 104, and having a feed roll 109 fixed at one side thereof. This roll 109 is preferably of a size such that the distance around the circumference will be equal to the distance between the cross wires on the strands, and it is provided with a notch 110 which is arranged to register with and receive the enlargements caused by the wrapping of the cross wires around the strands. Each of the smaller rollers 109 is arranged to coöperate with an upper feed roller 111 fixed to the shaft 88, Fig. 44 and the free end of each lever 104 is provided with a rod 112, provided with a spring 113, which latter serves to produce the necessary power to press the lower and upper feed rollers together with sufficient pressure to firmly grip the strand wires of the fabric and advance it through the machine as the shaft 103 is set in operation.

The fabric passes between the main feed rolls in a direction at right angles to the direction of its feed past the winders, and in order to guide the fabric from the vertical into the horizontal direction, the guide roll 114 is employed which is mounted on a shaft 115 journaled in bearing standards 116 on the bed of the machine, as shown in Figs. 40 and 45, and this guide roll is provided with a sprocket 117 over which the chain 93 passing over the sprocket 92 passes, the relative proportion of the gearing, or of the size of the roll 114, being preferably such that its peripheral speed will be slightly greater than the peripheral speed of the main feed rolls, and on this guide roll are provided a series of guiding ribs 118 spaced according to the spacing of the strand wires of the fabric, and having recesses 119 between the ribs at such points as to receive the cross wires as they pass over the roll, and as the peripheral speed of this roll is somewhat greater than the speed of travel of the strands of fabric, the shoulders at the ends of these recesses will serve to replace or properly position any of the cross-wires, should they become displaced, and this will bring them in proper position to be engaged by the strippers hereinafter described. The periphery of this roll is tangential to the normal line of travel of the fabric in passing between the winders and the plate 24 of the hopper carrier, as shown in dotted lines in Fig. 45, and consequently when the main feed rolls begin to operate, the strand wires will be thrown forwardly out of line with the winder housings and against the plate 24 by reason of the tension on the strand-wires assisted by the shedding bar 120, the latter having a series of open slots to receive and guide the strand-wires before they enter the winders and having plungers 121 operated on by a spring 122 on the standard for the wires, the strand-wires being normally held in these slots by the guides 278 arranged above the top row of winder housings, these springs normally operating to throw the strands forwardly to clear the winders, this shedding bar being so arranged that it will be engaged by the upper row of transfer slides as they are moved forwardly, and this will carry the shedding bar back against the action of its springs, and this will permit the strand-wires to enter the winders preparatory to the winding operation.

The fabric in passing between the guide roll 114 and the main feed rolls, is preferably supported by means of brackets 123 which are so located as to rest beneath and engage the cross-wires as they pass over them, and the strippers are also located between this guide roll and the main feed rolls. These strippers in the present embodiment of the invention are arranged in pairs for the reason that the winders, as shown, simultaneously apply two sets of cross-wires in temporary rows, and which before leaving the machine, are to be moved along the strands into line with the permanent rows to form two completed cross wires. Each of these strippers embodies a bar 124 (Fig. 42) mounted to reciprocate vertically in guides 125 secured to the bed of the machine and provided with rollers or other operating projections 126 at opposite ends thereof to coöperate with the cam tracks 127 (Fig. 36) formed preferably upon the upper sides of the reciprocatory racks 103, which latter also serve to operate the feed rolls, springs 128 serving to retain these rollers in coöperative relation with their respective cam tracks, so that as the rollers run down the inclines thereof, the stripper bars will immediately drop out of line with the fabric. On top of the stripper bars are provided a series of dies 129 corresponding in number and arrangement to the strand wires of the fabric, each of these dies having a recess 130 to receive the strand wire while the shoulders 131 at the sides of the recess serve to engage the two adjacent cross wires when the stripper bar is in elevated position, and thus serving to retain the cross wires that happen to engage them in stationary position.

The operation of these stripper bars is so timed that they will move into operative position to engage the temporary rows of cross wires and hold them until the fabric has been advanced a distance corresponding to the spaces to be formed between the cross wires of the finished fabric, the stripper serving to slide the cross wires along the strands until the wires connecting the adjacent strands are in proper alinement and form a continuous cross wire extending between the two border strands of the fabric. In the arrangement of winders, shown in Fig. 7, they are grouped to apply four incomplete rows of cross wires, and when this portion of the fabric passes the strippers they serve to assemble these four incomplete rows into two complete or continuous cross wires.

In order to hold the cross wires firmly in position on the strands and prevent possibility of their slipping out of place, it is preferable to crimp or form an offset in the strand wire adjacent to the points where the cross wires are wound thereon, and this result is accomplished in the present instance by the use of presses having dies to coöperate with the strands and the cross wires, as the latter rest between them. A pair of presses is shown in the present instance, Fig. 44, which are connected for simultaneous movement so as to crimp all of the joints in two of the complete cross wires, and the strands, and as these presses are duplicates, a description of one will suffice for both.

Each press comprises a heavy rigid beam 132 firmly secured at its ends to the bed of the machine and extending transversely to the direction of feed of the fabric. At the under side of this beam are arranged a series of stationary dies 133 which are spaced at distances corresponding to the spaces between the strands of the fabric. Each of these dies has a substantially flat impression surface, and is provided with a plunger 134 fitted in a vertical bore 135 in the press beam, a spacing rod 136 resting in the bore above the die, and serving to hold the latter firmly in position by reason of the action of the adjusting screw 137 bearing on its upper end. This screw may be conveniently reached and operated by a screw driver from the upper side of the beam so that the pressure on each individual pair of dies may be adjusted, a set screw 138 passing laterally through the beam and engaging the plunger 134 of the die to hold it in position to prevent its turning or dropping out of the bore in the press beam.

Opposite to each die 133 is arranged a counter die 139, each of these lower dies being mounted to operate vertically in a guide 140 firmly secured to the bed of the machine. Any suitable means may be employed for reciprocating these dies into and out of coöperative relation with the corresponding set of upper dies, this result being accomplished in the present construction by forming a rack 141 on each die of the lower set with which a corresponding pinion 142 is arranged to coöperate, and all of these pinions are fixed to a common rock shaft 143, the latter being preferably journaled in a bearing 144 forming a part of the guide for the corresponding movable dies. Each of the presses is provided with one of these rock shafts, and each rock shaft is provided on its end with a gear 145, Fig. 2, the two gears thus provided coöperating with a rack 146 mounted to reciprocate horizontally in bearings 147 at the side of the machine. The operation of the press dies is accomplished by the movement of this rack, and the operating means employed in the present construction embodies an operating lever 148 firmly pivoted at 149 to a bracket 150 secured to the side of the machine, the lever 148 being provided at its upper end with a cross head 151 and having adjusting screws 152 for setting the cross head at different distances from the pivotal center of the operating lever, this cross head being connected to the reciprocatory rack by a connecting rod 153 so that the adjusting screw 150 enables the pressure produced between the coöperating dies of the presses to be varied as required. The lower end of the operating lever 148 is provided with a roller or projection 154 arranged to travel in a cam track 155 formed in a cam 156, the cam having a high point 157 for moving the operating lever to close the presses with the maximum pressure, and as the cam continues its movement, this pressure will be somewhat relieved before the dies are entirely separated.

*Operating mechanism.*—Any proper means may be employed for operating the various devices hereinbefore described, that used in the present instance as shown in Fig. 52, comprising a power shaft 158 provided with a pulley or other means for transmitting power thereto and having a suitable connection with the main shaft 159 and intermediate shaft 160 for operating the takeup and winding drum by means of its sprocket 161, and having driving connections between it and the power shaft by means of the gears 162 and 163 and between it and the main shaft by the gears 164 and 165, the proportion of the gears 164 and 165 being preferably such that the shaft 160 will rotate three times while the main shaft rotates once. At one end of this main shaft is provided a cam 166 having a cam slot 167 therein of the form substantially as shown in Fig. 1, and with this cam is arranged to coöperate the main feed operating lever 168, pivoted to the shaft 169 at one end and having its opposite end operatively connected to a vertically-reciprocatory rack 170, and this rack coöperates with a pinion 171 fixed to the main feed operating shaft 172, and on the latter are secured a pair of gears 173 of an appropriate size and arranged to coöperate with the feed racks 103 as shown in Fig. 36. The transfer slides are also operated from this main shaft by means of a cam 174, the latter having a cam slot therein to coöperate with the roller or projection 175 on the operating lever 176, the latter being also pivoted at one end to the shaft 169 and connected at its operating end to the connecting rod 87, the latter in turn being connected to the cross head 83, which in turn is connected to the operating rack 80, as shown more clearly in Figs. 30 and 31.

The mechanism for operating the winders is also driven by a cam 177 fixed on the main shaft 159, the latter having an appropriate cam thereon to coöperate with the roller 178 on the winder operating lever 179, the latter being pivoted at one end to the shaft 169 and having a connecting rod 180 pivotally connected to its operating end. This connecting rod is attached to a rack 181, Fig. 2, secured to one end of the winder supporting standard and arranged to be reciprocated vertically by the operation of its cam. This rack coöperates with a set of pinions 182, each journaled in bearings 183 on the standard and having pinions 184 at their opposite ends coöperating simultaneously with the teeth 185 and 186 formed on the ends of each pair of racks 17 and 18, as shown clearly in Figs. 3 and 7. In such a construction it will be understood that as these pinions 184 rotate in one direction they will simultaneously operate the racks of each pair in reverse directions, and as the pinions 15 of each pair of winders are connected alternately to the upper and lower racks, it will be understood that at each operation of the racks, 71 and 18, the winders of each pair will rotate in reverse directions, and the purpose of this will be hereinafter described.

*Takeup and winding drum.*—It will be understood of course that any suitable means may be provided for taking up the fabric as it is manufactured by the machine and reeling it into marketable form, but it is particularly desirable to employ an automatic take-up that will begin to operate the moment the main feed for the fabric is thrown into operation, and that will compensate for the variations in the diameter of the rolls of the material as it is wound on the drum, and it is also desirable that a take-up be employed that will maintain the proper tension on the strands, extending through the machine. The take-up and winding mechanism fulfilling this requirement is shown in Figs. 53 to 58, embodying a winding drum composed of a pair of segmental sections 187 and 188, preferably formed of sheet material and having hinged members 189 and 190 at one end connected by a hinge pin 191, the lugs of the hinge members being preferably so spaced that a sufficient length of the hinge pin 191 is left uncovered and accessible to form a handle by means of which the winding drum may be readily handled. The free ends of the sections are adapted to fit into a sleeve 192, a wedge 193 having the double wedge surfaces 194 and 195 thereon being provided and adapted to pass through diametrically opposed apertures 196 and 197 in the sleeve, and to engage in the recesses 198 formed in the opposite edges of the two sections so that when the wedge is forced into the position shown in Fig. 56, the sections of the drum will be expanded within the sleeve 192, and the recesses 198 coöperating with the wedge will prevent longitudinal disengagement of these sections and the securing sleeve. When the wedge is moved in an opposite direction the narrow portions will rest opposite to the recessed edges of the drum sections, and this will permit the latter to collapse sufficiently to enable the sections to be withdrawn from the securing sleeve, and the collapsing of the sections reduces the diameter of the drum sufficiently to enable it to be slipped out of the roll of fencing, which is wound tightly thereon, and would otherwise be difficult to remove. In order to enable this drum to be made comparatively light in weight and still prevent its springing, or the drawing together of the sections by reason of the tension of the fencing as the latter is wound on the drum, I prefer to employ a reinforcement embodying in the present instance, a shaft 199 journaled in a bearing 200 toward the end of the drum and provided with an operating nut 201 accessible from the exterior of the drum, the inner end of the shaft being journaled in the bearing 202, located at an intermediate point relatively to the end of the sections, and having a cam 203 thereon arranged to coöperate with an abutment 204 on the opposite section. By applying a wrench to the nut 201 the shaft 199 will be rotated until the cam 203 at its inner end rests against the abutment 204 and this will serve as a prop for maintaining the proper spacing of the sections of the drum, so that the accumulating tension of the fencing as it is wound thereon will not draw the sections together. When this reinforcement is moved into inoperative position, the sections of the drum may be readily collapsed and the cam 203 will clear the axial slot formed between the two sections of the drum, so that the inner ends of the roll of fencing which are usually passed through the slot to secure them, may be readily slipped between the sections without encountering any obstructions.

The sleeve 192 not only secures the free ends of the drum sections in their proper relative positions, but the locking of these sections with the sleeve by the wedge 193, serves to drive the drum, this sleeve being secured to a shaft 205 journaled in suitable bearings 206 and 207. Between these bearings is provided the operating mechanism for throwing the drum into and out of operation. The automatic take-up motion of the drum is best accomplished by the use of a clutch of the type shown in Figs. 53 and 58, and it comprises a pair of oppositely-arranged disks 208 and 209, the former being firmly keyed to the shaft and provided on its periphery with a set of ratchet teeth 210, arranged to coöperate with a pawl 211, this pawl being so arranged as to permit the forward feed movement of the drum, but serving as a stop to prevent retrograde movement thereof. The disk 209 is keyed to the shaft in such a way that it will transmit rotary movement thereto, but is capable of a relatively axial movement thereon, and on the shaft between these disks is loosely fitted a driving member 212 having a pair of friction faces 213 and 214 arranged opposite to, and corresponding with the disks on the shaft, and between these surfaces and their corresponding disks are preferably interposed sheets of fiber 215, which, when sufficient pressure is produced between the disks and their corresponding friction surfaces, will serve to produce the requisite friction for revolving the drum and, at the same time will avoid undue wearing. At the outer side of the disk 209 is a plate 216 fitted loosely on the shaft and provided with springs 217 arranged to bear on the adjacent disk 209 and produce a yielding pressure thereon tending to move it in a direction axially of the shaft, and behind this plate are arranged a set of cam levers 218 fitted in radial slots 219 in a shell 220 resting on the shaft and having shoulders 221 thereon engaging the forward ends of the shell as an abutment, while their forward ends 222 press against the rear of the plate 216. The free ends of these levers are arranged to be operated on by the conical or inclined surface 223 formed in the interior of a sleeve 224, the latter being movable in a direction axially of the shaft. This sleeve in the present instance, is operated automatically, and at the proper time, by the main portion of the machine, and for this purpose it is provided with a peripheral groove 225, arranged to coöperate with a fork 226 formed on a bell crank 227, the latter being pivoted at 228 and connected by an actuating rod 229 to the press operating lever 148 at 230, so that the movement of this press operating lever will serve to operate the clutch. The pressure produced between the cam levers 218 and the plate 216 is regulated by a hand wheel 231 having its hub threaded on the shaft 205, and bearing against the rear of the shell 220, and in order to supply power to the clutch member, it is preferable to provide it with a power transmitting device, that shown in the present instance being a sprocket wheel 232, over which passes a sprocket chain 233, which in turn passes over a sprocket wheel 234 arranged on the counter shaft 235, the latter in turn having a sprocket wheel 236 connected by a chain 237 for connecting it with the sprocket wheel 161 on the shaft 160.

The free end of the winding drum is preferably supported in an open bearing in order to facilitate its removal or replacing by reason of the formation of the completed rolls of fencing, and in the present instance I provide a bearing standard 238 Fig. 1 having a set of rollers 239 arranged in an arc concentric and in alinement with the axis of the shaft 205, and these rollers are so spaced as to receive the periphery of the winding drum, and roll thereon as a bearing, a combination of three rollers being preferably provided which leave an opening on that side opposite to the side on which the tension is applied to permit the insertion and removal of the drum.

*Strand feed and controlling mechanism.*— As hereinbefore described, the main feed advances the fabric through the machine step by step or intermittently in order to permit the completion of the various operations performed thereon by the machine, and as the material of the strand wires is supplied in the most convenient form from reels which are freely revoluble, it is desirable, if not necessary, to employ mechanism for gradually drawing the wire from the reels to prevent the reels from running ahead of the wire feed and tangling the wire, and this is accomplished in the present instance by novel devices for producing a substantially continuous and even feed from the reels and controlling devices for compensating automatically between this continuous feed and the intermittent feed of the fence machine. A device of this kind is shown in Figs. 49, 50 and 51 as embodying generally, a bed 240 suitably supported on legs or standards 241, and on top of this bed a set of feed rolls 242 are provided to correspond in number with the number of strand wires to be fed, these rolls being fixed on a sufficiently rigid shaft 243 which is journaled at its end in bearing brackets 244, mounted on the upper ends of the bed. Beneath and to the side of the upper rolls is journaled an operating shaft 245 by means of which the lower coöperating rollers are driven, a set of levers 246 in the form of a bell-crank in the present instance, having their arms 247 bored to loosely fit the shaft 245 and having laterally-extended sleeves or hubs 248, journaled in bearings 249 fixed to the top of the bed, such a construction causing the strain inserted on these bell crank levers to be transferred and sustained by the bearings secured to the bed rather than by the operating shaft, as this would produce unnecessary friction if these levers were fulcrumed directly on the roll operating shaft, and they would not be so firmly supported. The shaft 245 has a pinion 250 fixed thereto adjacent to each of the regulating levers 246, and on the latter preferably at a point intermediate its two arms is journaled a feed roller 251, arranged to be moved into and out of coöperative relation with its corresponding upper feed roll 242 as the regulating lever is operated, and this lower roll has a pinion 252 fixed thereto and coöperating with its corresponding pinion 250 on the lower feed roll operating shaft 245,—the pinions 250 and 252 remaining in their proper coöperative relations, irrespective of the relative positions of the feed rolls by reason of the fact that the regulating member 246 on which it is carried, moves about the operating shaft 245 as a center.

It is preferable to drive the upper and lower feed rolls at the same peripheral speed, and this is accomplished in the present instance by providing the gears 253 and 254 on the shafts 243 and 245 respectively, the feed rolls on the upper shaft being preferably double the diameter of the lower rolls, and of course the gears 243 and 245 having a proportionate ratio,—that is, the gear 253 will be double the diameter of the gear 254, and these gears are connected by an intermediate gear 255 that will transmit motion between them and will cause the rolls to revolve in their proper directions.

The free arms of the regulating levers 246 extend some distance below the bed, and each of these levers is provided at its lower end with a yielding abutment, the latter being in the form of a leaf spring 256, in the present instance, fixed to the lever at its upper end and having its other end doubled or turned under as at 257, an adjustable stop in the form of a set screw 258 extending through the regulating lever and having its inner end bearing against a plate 259 serving to adjust the position of the yielding abutment, the plate 259 bearing against the doubled or under-curved portion of the spring, and permitting it to yield when a sufficient pressure is applied thereto. Each of the regulating levers is preferably provided with a yielding abutment, and coöperating with these abutments are a corresponding set of cams 260, each of the latter being loosely journaled on a shaft 261 suitably supported on the standards of the machines and having a controlling lever 262 for operating it. This controlling lever is preferably adjustable angularly in relation to the cam, it being pivoted in the present instance at 263 and provided with an adjusting screw 264, resting in the segmental slot 265 of the cam.

The wire is fed to the feed rolls preferably through a wire straightening device 266 of any desired type, arranged in alinement with the coöperating surfaces of the corresponding upper and lower feed rolls, and when the controlling lever occupies the position shown in Fig. 49, the feed rolls will be disengaged from the wire, and while the rolls continue to run, as will be hereinafter described, the wire will not be fed or advanced. However, when the controlling lever is elevated into the position indicated by dotted lines, the cam 260 coöperating with the yielding abutment 256, will operate the roll adjusting lever 246 to bring the lower feed rolls 251 into coöperative relation with its corresponding upper roll 242, compressing the wire between them and causing it to feed forwardly. The movements of the controlling lever are controlled by the amount of slack in the wire between these feed rolls and the machine, and at times the amount of slack varies between considerable limits, and in order to produce a substantially even pressure on the wire, when the feed rolls are thrown into coöperative relation, and thus avoid excessive pressure on the wire, and strain on the rolls and their operating parts, it is preferable to employ a yielding connection or abutment of the kind described between the cam on the controlling lever, which is shifted according to the amount of slack in the wire and the roll adjusting levers 246, and this connection will yield when the pressure between the rollers reaches given limits.

Each of the strand wires is threaded through a tension spring 267 which is sufficiently flexible to permit the wire to assume the proper curvature and to prevent it from kinking, and on this spring is fitted a collar 268 having a headed screw or projection 269 adapted to fit in a slot 270 provided in the upper or free end of the controlling lever 262, this slot being preferably open at the under side of the lever to admit the projection 269 and having an upper angular portion to retain the projection. In order to maintain the proper tension in the strand wires between the feed rolls and the machine, it is preferable to apply weights either to the controlling lever 262 or to the tension spring 267, and for this purpose I have provided weights of the form shown in Fig. 51, comprising a body portion 271 having an aperture 272 of a sufficient size to permit the weight to fit over the spring 267, and having a slot 273 having a sufficient width to permit the weight to fit over the upper edge of the controlling lever, this slot also serving to permit the weight to be passed over the strand wire and slipped on to the tension spring without the necessity of threading the wire through it.

As previously stated, the feed rolls for supplying the wire preferably have a continuous feeding movement, as distinguished from an intermittent movement, in order to avoid the tangling of the wires on the supply reels, and in the present instance these rolls are driven from the operating shaft of the machine by a chain 274 passing over a sprocket 275 on the shaft 159 on the machine, as shown in Fig. 52, and over a sprocket 276 preferably arranged on the shaft 243 of the upper feed rolls, the feeding of the wire being accomplished by the controlling levers acting on the lower feed rolls, rather than by an intermittent driving connection.

*Operation of the machine.*—Let it be assumed that the transfer slides occupy the relative position shown in Fig. 16; that is to say, they rest in retracted position, and each is supplied with a cross wire resting between the coöperatively-arranged shoulders 38 and 39 on the rails and the shoulders 46 on the latches. At this moment the winders will be in a state of rest, and the main feed rolls for the fabric will be stationary, and as the main operating shaft 159 continues to rotate, the cam 174 thereon will operate the lever 176 to elevate the connecting rod 87, and the latter operating through the cross head 83 will elevate the rack 80, and the latter operating through the pinion 79 on the rows of transfer slide operating shafts 77, will rotate the latter and the pinions 78 thereon, and as these pinions coöperate with the racks 30 of their respective transfer slides, the latter will be advanced toward the winders. As each transfer slide advances, the cams 48 thereon will coöperate with the ledges or feet 58 at the lower end of the feed plate, lifting the latter to cut off the supply of cross wires between it and the transfer slide, and simultaneously elevating its upper end 62 into the position shown in Fig. 29, cutting off the supply of cross wires between the runway 63 and the feed plate, the yielding follower 63 serving to accommodate the cross wires lifted by the feed plate and thereby prevent excessive pressure thereon. The forks 34 and 35 carried by the slide readily locate the strand wires and center them relatively to the slots or openings leading into the winders, and as the slides move forward, these forks will carry the strand wires into the winders and hold them centered axially thereof.

The upper row of slides engage the shedding bar or member 120 to press it rearwardly against the yielding pressure of its spring 122, and this will permit the strand wires to move into alinement with the axes of the winders, as shown in Fig. 45. As the slides approach the limit of their forward movements, the bevel ends on the forward ends of the latches 42 and 43, coöperate with the relatively fixed springs 277 arranged beneath the winders, and these springs serve to lift the latches and bring the cross wire resting thereon into a position to engage the hooks 22 of the winders of each pair. At this moment the operating cam 174 reaches a point where the movement of the rack 80 will be arrested, and this will cause the slides to be held in forward position and in coöperative relation with their respective pairs of winders, and at this point the cam 177 will operate the lever 179 to reciprocate the connecting rod 180, the latter being connected through the rack 181 and pinions 182 and 185 to the winder operating racks 17 and 18, and as the pinions 185 are rotated, it will cause a simultaneous movement of the racks of each pair in reverse directions, and as each pair of winders have their operating pinions connected alternately to the upper and lower racks, operation of these racks will cause rotary movement of the winders in reverse directions. As the strand wires are centered axially of their respective winders and the ends of each cross wire are engaged by the hooks 22 on the winders, rotation of the latter in opposite directions will cause the ends of the cross wires to be wound about the strand wire extending through the respective winder, the spiral cam surface 21 on each winder coöperating with the upper convolution of each coil as it is formed, and thereby serving to force it downwardly along the strand to provide space for the formation of the succeeding convolutions, the recesses 38 and 39 in the rails on the transfer slide serving to accommodate the lowermost convolution of the coil or winding. During the winding operation the latches 42 and 43 are pressed against the intermediate portion of the cross wire extending between the strands, by the springs 45 on the slide assisted by the relatively fixed springs 277, the pressure being sufficient to hold the shoulders 46 thereon in coöperative relation with the cross wire and thereby resist forces tending to bend the cross wire during the winding operation, the yielding action of the springs permitting these latches to recede from the winders while the winding operation progresses. Any number of turns may be given the cross wire to form a corresponding number of convolutions about the strand wires, but it has been found that two turns are sufficient, and the winders and their operating parts are so proportioned in the present instance.

The winding operation occurs simultaneously for all the cross wires, but of the full number of cross wires applied, but half of them will occupy approximately the positions they should occupy when the fabric is completed, the stripping of the wires into proper alinement being performed in a subsequent operation. After each operation of the winders, in applying a set of cross wires, the cam 174 imparts a return motion to the lever 176, lowering the rack 80 to simultaneously retract all of the transfer slides, and as each of these slides is retracted, the cams 52 and 53 thereon, coöperating with the ledges 58 at the lower end of the feed plate will permit the latter to lower under the action of its spring 59, and this will reëstablish connection for the cross wires at the runway and the feed plate, and it will permit the ledges 58 on the feed plate to move sufficiently far to permit the discharge of a cross wire to engage between the coöperating shoulders 48 and 49 on the rails and the corresponding oppositely-arranged shoulders 46 on the latches, preparatory to the feeding of another cross wire for the next winding operation. As the top row of slides is retracted, the shedding bar or member 120, located above the winders, will be pressed forward, under action of the springs 122, automatically carrying the strand wires into the position shown in dotted lines in Fig. 45, and in this position the strands and cross wires will clear all of the winders. While the strand wires occupy this position the cam 166 will set the lever 168 into operation, and through the rack 170 and its coöperating pinion 171, it will rotate the shaft 172 carrying the gears 173, and the latter coöperating with the feed racks 103 will cause the latter to be moved forwardly or in the direction indicated by the arrow in Fig. 36. As one of these racks coöperates with the pinion 98 connected by the clutch members 99 and 100 to the shaft 97, it will cause operation of the main feed rolls for the fabric which are driven from the shaft 97, and at the same moment the operating arm 229 connected to the press operating lever 148 will be operated by the movement of the latter, to throw the sleeve 224 toward the cam 218, the conical or inclined surfaces 222 and 223 thereon coöperating with these levers to set the plate 216 against the friction disk 209 with sufficient pressure that the friction produced between the disks 208 and 209 on the drum operating shaft and the friction faces 213 and 214 on the clutch driving member 212 driven continuously by the sprocket 232 will set the take-up and winding drum into operation to reel the fencing or fabric thereon. This simultaneous operation of the winding drum and the main feed rolls will advance the fabric a sufficient distance to bring the strand wires into position to receive another set of cross wires from the winders, while those applied by the previous operation will pass around the guide roll 114, the recessed ribs 118 thereon serving to spread or properly space any of the cross wires should they become displaced in leaving the winders.

As the fabric is fed beneath the presses, two of the sets of temporarily placed cross wires will be simultaneously slipped along the strands until they are in alinement with those sets of cross wires which were located approximately in their permanent position, and this automatic arranging of the cross wires is accomplished by the strippers, having dies thereon which normally rest below the plane of the fabric, but which at the proper moment are elevated by the cams 127 preferably carried by the racks 123 so that they will permit the passage of those sets of cross wires which have been permanently located, and will engage a temporary set of cross wires and hold them while the strands continue to feed, and in this way the incomplete rows of cross wires are assembled in alinement to form two complete rows.

As the press-operating member 148 reverses its movement, by reason of its connection with the cam 155, it will operate the rod 229 to interrupt the reeling operation of the winding drum, and at the same time it will reciprocate the rack 146, rotating the gears 145 coöperating therewith, and mounted on the press operating shafts 143, and as the latter rotate, the pinions 142 fixed thereon and meshing with the racks 141 will elevate the lower sets of dies 139, causing them to move into coöperative relation with the upper sets of dies 133, each pair of dies having one of their members provided with a recess to receive the coil, and the other die having a flat surface for forcing the coil into the recess, thereby producing a compressing action on the coil to bind it firmly on the strand wire, and at the same time crimping or forming an offset in the strand wire that will prevent a relative longitudinal movement of the cross wires thereon, so that they will be firmly held in their properly placed positions. In Fig. 48 the appearance of the fabric before and after the stay or cross wires have been assembled, is shown.

From the foregoing description it will be obvious that the fabric is advanced progressively; that is to say, with an intermittent movement in order that the various operations may be performed thereon with the greatest facility, and the strand supply feed which is arranged between the machine and the supply reels is adapted to equalize or compensate for this intermittent movement of the strand wires in order that the reels may revolve with a substantially uniform movement to avoid tangling of the wires thereon, and as before stated, this strand wire supply feed has its feed rolls driven continuously from the main operating shaft to the machine, and the wire supplied to the machine is controlled according to the amount of slack between the machine and the supply feed, that is to say, when the main feed for the fabric is interrupted the weighted tension spring 267 and the controlling lever 262 connected to it gradually lowers as the amount of slack produced by continued feeding movement of the rolls increases, and when the controlling lever 262 reaches a given point in its lowering movement, the cam 260 thereon will have reached such a position as will enable the adjusting lever 246 to operate and separate its corresponding pair of feed rolls, and as the pressure is relieved therefrom, the traction or feeding action of the rolls will be temporarily discontinued. However, on the next feed movement of the fabric, this slack between the strand wire supply feed and the machine will be taken up, causing the tension spring and the controlling member 262 to rise, and as this lever rises, it will rotate the cam 260 and the latter in turn will operate the roll adjusting member 246, bringing the rolls into coöperative relation and starting the feed movement of the strands from the reels.

By grouping the winders in pairs for applying the stay or cross wires to the adjacent strand wires, and arranging these pairs of winders in multiple rows, a plurality of sets of stay or cross wires may be applied simultaneously and at a single winding operation of the machine, and these sets of cross wires when assembled by the strippers form a multiple number of complete cross wires extending continuously across the fabric, and while the number and relative arrangement of the winders and their coöperating parts are, in the present embodiment of the invention, adapted for simultaneously applying four rows of stay or cross wires to the strands, which, when assembled, will form two complete cross wires, it will be understood, of course, that the invention is not limited with respect to the number of cross wires that may be applied at that time, the improved method and devices for feeding or supplying the cross wires rendering it convenient to simultaneously apply any number of cross wires simultaneously to the strands.

It is preferable to employ the strippers for assembling adjacent sets of stay or cross wires into complete cross wires extending continuously and in alinement across the fabric, as fencing manufactured in this way is very durable, and strains exerted in the direction of the width of the fencing will be withstood by the cross wires without bending the strand wires, but the use of the strippers may be dispensed with, in which case, the cross wires would be arranged in rows spanning the alternate strands, the appearance of the two styles of fencing just described being shown in Fig. 48.

The improved method and devices for supplying the cross wires to the winders not only eliminates the necessity of employing an additional set of reels for supplying the material for the cross wires, with the attendant objectionable features such as the floor space required and the attention required from the operator in keeping such reels in order and replenished with stock, but it also insures certainty of operation, as all of the cross wires fed to each pair of winders arranged in the same vertical row are all cut to the same length, and the transfer slides and the feed plates are so constructed that a cross wire will be transferred from each hopper to the corresponding pair of winders with certainty at each operation of the slide. Moreover, the improved method of controlling the flow of cross wires from each hopper to the corresponding transfer slide insures certainty of feed and avoids the possibility of the cross wires becoming disarranged and clogged, as the discharge passages and their controlling devices are arranged to gradually restrict the number of cross wires flowing therethrough until a single column of cross wires rests on and is controlled by the feed plate, the latter in turn being controlled by the transfer slide and the latter coöperating with the intermediate portions of the cross wires during the winding operation, serve to hold the latter firmly in coöperative relation with the winders, and also prevent bending of the cross wires during the winding.

The automatic shedding bar or member, while in the present instance of simple construction, serves to automatically throw the fabric out of the plane of the winders after each winding operation has been completed, and this insures the proper clearance between the fabric and winders as the fabric is advanced, by reason of the cross wires being applied in multiple horizontal rows, and of course in such a case the cross wires applied by the upper winders must clear the lower winders.

The multiple arrangement and operation of the presses corresponds with that of the winders, that is to say, the number of presses employed corresponds to the number of complete cross wires applied by the winders and assembled by the strippers, and as these presses are connected for simultaneous operation, they perform the crimping or offsetting of the strand wires to prevent displacement of the cross or stay wires, at a single operation. The strippers are preferably employed in combination with these presses, as they are set in operative position at the proper moment to engage and strip the rows of temporary cross wires into alinement with the permanent row, and they place the completed row thus assembled in operative position between the dies of the presses, and these stripping operations are, in the present instance, accomplished conveniently by mounting the strippers to operate in planes arranged transversely to the direction of feed of the fabric, and as the fabric is advanced, these strippers will be automatically set in position to engage and hold the temporary row of cross wires and bring them and the permanently located row in alinement between the dies of the presses.

The take-up and winding drum is particularly adapted for use in connection with a machine of the kind described, as the automatically-controlled clutch serves to set the drum into operation at predetermined periods in the operation of the machine, and in this way, it assists the main feed rolls in drawing the fabric through the machine, and it maintains a tension on the strands of the fabric leading from the machine, and as the driving and driven elements of the clutch are connected by the friction surfaces, the clutch will compensate for the increasing diameter of the fencing reeled on the drum. The drum is especially adapted for use on a machine wherein its product is reeled under tension, as it is so constructed that it cannot become sprung or distorted, and when it is desirable to remove a reel of fencing therefrom, it is only necessary to withdraw its locking wedge and release the reinforcement, and it may be readily removed and replaced in the machine as it is detachably connected at one end to its operating shaft by its locking device, and its opposite end is supported by an open bearing.

The strand wire feeding and controlling mechanism is especially adapted for use in combination with a machine of the kind described having a step-by-step or intermittent feed movement for the fabric, as it neutralizes the sudden starting and stopping movement of the strands as it occurs in the machine, and draws the wires from their supply reels with a gradual and substantially uniform movement so that loosening and tangling of the bundles of wire on the reel are not liable to occur, and as the amount of slack in the strand wires leading to the machine controls the feeding operation of the feed rolls, the proper amount of strand wire will be supplied to the machine at all times, and should it be desirable to operate the machine for testing purposes and without advancing the fabric, the strand wire feeding devices will take care of themselves without the necessity of being disconnected, and, of course, should one of the strand wires break or become exhausted, it will permit its corresponding controlling lever to drop, serving as a signal to the attendant and as an indicator for designating the particular strand wire requiring attention.

The novel manner of mounting the hoppers and their feeding devices, and, in fact, the entire cross wire feed mechanism as a complete unit on a pivoted support or carrier, facilitates the setting up of the machine, and also permits, by reason of its novel driving connections with the driving mechanism of the machine, the machine to be operated while the carrier is in opened position, and as the winders and the transfer and feed devices are exposed at this time, they may be conveniently inspected during actual operating conditions.

I claim as my invention:

1. In a machine for making wire fencing, the combination with a bed having suitable means for supporting the strand-wires, of cross-wire winders arranged in multiple sets extending transversely across the strand-wires and adapted for simultaneously applying a number of cross-wires equal in their aggregate length to the length of a plurality of complete cross-wires.

2. In a machine for making wire fencing, the combination with a bed having suitable means for supporting the strand-wires, of cross-wire winders arranged in a set extending in a direction transversely of the strand-wires and adapted for applying a row of cross-wires to the strand-wires, and strippers arranged to coöperate with the cross-wires for positioning them on the strand-wires.

3. In a machine for making wire fencing, the combination with a bed having suitable means for supporting the strand-wires, of cross-wire winders arranged in sets and adapted to simultaneously mount the cross-wires in rows on the strand-wires, and strippers arranged to coöperate with the cross-wires of one row to assemble them with those of the next adjacent row.

4. In a machine for making wire fencing, the combination with a bed having suitable means for supporting the strand-wires, of cross-wire winders arranged in sets and adapted to mount the cross-wires on the strands in rows extending transversely of the strand-wires, the cross-wires of one row alternating with those of the next adjacent row, and strippers for assembling the cross-wires of one row with those of another row to form a complete cross-wire extending continuously across the fabric.

5. In a machine for making wire fencing, the combination with a bed having suitable means for supporting the strand-wires, of cross-wire winders arranged in rows and adapted for simultaneously mounting the cross-wires in temporary and permanent rows, the cross-wires of one row alternating with those of another row, and strippers arranged to coöperate with the cross-wires of the temporary row for assembling with those of the permanent row.

6. In a machine for making wire fencing, the combination with a bed having means for suitably supporting the strand-wires, of cross-wire winders arranged in rows extending transversely of the strand-wires, the winders of each row being grouped in pairs and adapted for simultaneously mounting the cross-wires on the strands so as to span the alternate spaces between the strand-wires, the cross-wires thus mounted alternating in one row with those of the next adjacent row, and strippers for assembling the cross-wires of one row with those of the next adjacent row.

7. In a machine for making wire fencing, the combination with a bed having suitable means for supporting the strand-wires, of means for mounting the cross-wires in rows extending transversely across the strand-wires, the cross-wires of one row alternating with those of the next adjacent row, and means for alining the cross-wires of one row with those of the next adjacent row.

8. In a machine for making wire fencing, the combination with a bed having means for suitably supporting the strand-wires, of means for mounting the cross-wires on the strand-wires in rows extending transversely of the strand-wires, strippers for alining the cross-wires of one row with those of the adjacent row, and a press for securing said cross-wires after they have been brought into alined position by the strippers.

9. In a machine for making wire fencing, the combination with means for suitably supporting the strand-wires, of means for simultaneously mounting the cross-wires in a series of rows extending transversely of the strand-wires, means for assembling the cross-wires of one row with those of the next adjacent row to form complete cross-wires extending continuously across the fabric, and presses connected for simultaneous operation for securing the cross-wires thus assembled.

10. In a machine for making wire fencing, the combination with means for suitably supporting the strand-wires, and feed devices for advancing the strands by a step-by-step movement, of means for mounting the cross-wires in rows on the strand-wires while the latter are at rest, and strippers arranged in operative position during the feed movement of the strand-wires, for positioning the cross-wires thereon.

11. In a machine for making wire fencing, the combination with devices for suitably supporting the strand-wires, and means for mounting cross-wires thereon, of feed devices for advancing the fabric step-by-step after the mounting of each set of cross-wires has been completed, and a winding drum for reeling the completed fabric having means for setting it in operation simultaneously with the feed devices.

12. In a machine for making wire fencing, the combination with devices for suitably supporting the strand-wires, and means for mounting cross-wires thereon, of feed devices operating after the mounting of each set of cross-wires has been completed, a take up and winding drum for reeling the completed fabric thereon, and an automatic clutch for setting the winding drum into operation simultaneously with the feed devices for reeling the fabric as it is fed forward, and normally operating on the drum to maintain a tension on the strand-wires of the fabric.

13. In a machine for making wire fencing, the combination with devices for suitably supporting the strand-wires, and means for mounting cross-wires thereon, of feed devices for advancing the fabric after each set of cross-wires have been mounted, a drum for reeling the fabric thereon, and an automatically controlled friction clutch connected to the drum normally tending to operate the drum to reel the fabric, and setting the drum into operation for reeling the fabric simultaneously with the feed operation of the feed devices.

14. In a machine for making wire fencing, the combination with devices for supporting the strand wires, of a hopper adapted to contain a plurality of cross wires all previously cut to the proper length, feeding devices reciprocating in a plane transversely of the plane of the strand wires and coöperating with the hopper to remove single cross wires therefrom and present them successively to the strand wires, and means for mounting the cross wires on the strand wires.

15. In a machine for making wire fencing, the combination with means for suitably supporting the strand-wires, of devices reciprocatory in paths transversely of the plane of the strand wires for feeding cross-wires thereto by a movement of the cross-wires bodily laterally, and devices arranged to receive the cross-wires from the feed devices and wind them on the strand-wires.

16. In a machine for making wire fencing, the combination with means for suitably supporting the strand-wires, of devices reciprocatory in paths transversely of the plane of the strand wires for feeding a cross-wire to the strand-wires so that its ends rest on the same side of the strand-wires, and devices coöperating with the ends of the cross-wires for winding them in opposite directions on the strand-wires.

17. In a machine for making wire fencing, the combination with the winders adapted to receive the strand-wires and having projections thereon, to coöperate with the cross-wires, of a feed device for supplying the cross-wires to the winders having a pair of latches arranged to support the cross-wire during the winding operation.

18. In a machine for making wire fencing, the combination with the winders adapted to rotate about the strand-wires, and means for rotating the winders in opposite directions, of a feed device for supplying cross-wires to the winders, and a pair of latches having shoulders thereon arranged to coöperate with the cross-wires to prevent bending thereof during the winding operation.

19. In a machine for making wire fencing, the combination with cross-wire winders arranged to rotate about the strand-wires, of feed devices for supplying the cross-wires to the winders, and yieldingly operated latches for holding the cross-wires in coöperative relation with the winders.

20. In a machine for making wire fencing, the combination with a pair of cross-wire winders mounted to rotate about the strand-wires, of devices for supplying cross-wires to the winders, and yieldingly operated members for inserting the cross-wires into the winders and having shoulders thereon adapted to coöperate with the cross-wire during the winding operation to prevent bending thereof.

21. In a machine for making wire fencing, the combination with devices for suitably supporting the strand-wires, of a pair of cross-wire winders adapted to coöperate with the cross-wire to wind it about the corresponding strand-wires, each winder having a cam thereon conforming substantially to the pitch of the convolutions to be formed, and adapted to coöperate with the convolutions of the cross-wire during their formation.

22. In a machine for making wire fencing, the combination with devices for suitably supporting the strand-wires, of a pair of winders connected for operation in reverse directions and arranged to coöperate with the cross-wires for winding them on the strand-wires, and reversely arranged spiral cams formed on the winders and arranged to coöperate with the cross-wire during its formation into convolutions about the strand-wires.

23. In a machine for making wire fencing, the combination with devices for suitably supporting the strand-wires, of cross-wire winders adapted to center the strand-wires axially thereof, and a cam formed on each winder having a recess therein of a depth sufficient to receive the end of the cross-wire, the surface of the cam being arranged to coöperate with the convolutions of the cross-wires during the winding operation.

24. In a machine for making wire fencing, the combination with means for suitably supporting the strand-wires, of cross-wire winders adapted to center the strand-wires axially thereof, and having recesses extending transversely of their axes, the recesses of the winders being in alinement prior to the winding operation, and means for introducing a cross-wire into said recesses of the winders.

25. In a machine for making wire fencing, the combination with means for suitably supporting the strand-wires, of cross-wire winders having recesses normally arranged in alinement for receiving a cross-wire between them, and spring pressed members for inserting a cross-wire in the recesses of the winders.

26. In a machine for making wire fencing, the combination with means for suitably supporting the strand-wires, of cross-wire winders each adapted to rotate about one of the strand-wires as an axis, and latches for supplying a cross-wire to the winders, and having shoulders arranged to coöperate with the cross-wires at points intermediate of the strand-wires and serving as abutments for preventing bending of the cross-wire during the winding operation.

27. In a machine for making wire fencing, the combination with means for suitably supporting the strand-wires, of cross-wire winders adapted to receive the cross-wires and wind their ends about the strand-wires, a reciprocatory transfer slide, members thereon adapted to support a cross-wire and arranged to carry it opposite to the winders, and means for automatically operating said members to apply the cross-wire to the winders.

28. In a machine for making wire fencing, the combination with means for suitably supporting the strand-wires, of cross-wire winders having recesses in their ends to receive the cross-wires and to wind their ends about the corresponding strand-wires, a transfer slide, members pivoted thereon and adapted to carry a cross-wire to the winders, and a spring arranged to coöperate with said members to insert the cross-wire into said recesses of the winders.

29. In a machine for making wire fencing, the combination with means for suitably supporting the strand-wires, and cross-wire winders arranged to rotate axially of the corresponding cross-wires and having recesses in their ends to receive the ends of a cross-wire, of a transfer slide, members pivoted thereon and adapted to advance a cross-wire toward the winders, and relatively fixed springs arranged to coöperate with said members for inserting the cross-wires into the said recesses of the winders.

30. In a machine for making wire fencing, the combination with means for suitably supporting the strand-wires, and cross-wire winders for axially centering their respective strand-wires and having spiral cam surfaces at their ends provided with recesses to receive the ends of the cross-wires, of a transfer slide, members pivoted thereon adapted to carry a cross-wire to the winders, and a spring coöperating with said members for applying the cross-wire to said recesses of the winders and serving to yieldingly retain the cross-wire in operative position during the winding.

31. In a machine for making wire fencing, the combination with means for suitably supporting the strand-wires, and revoluble winders arranged for axially centering the strand-wires, and having means for engaging the cross-wires for winding them about the strand-wire, of a transfer slide operable in a plane transverse to the plane of the strand-wires, and means carried by the transfer slide and yieldable in a direction transversely to its plane of movement for retaining a cross-wire in coöperative relation with said recesses of the winders.

32. In a machine for making wire fencing, the combination with means for suitably supporting the strand-wires, and winders having recesses to engage the ends of a cross-wire for winding them about the correspond strand-wires, and spiral cam surfaces formed on the winders and adapted to operate during the winding operation for moving the winding axially of the winders, of a reciprocatory transfer slide operable in a direction transverse to the plane of the strand-wires, arms thereon pivoted to swing in planes transverse to the plane of movement of the slide, and adapted to apply a cross-wire to said recesses of the winders, and a spring coöperating with said arms for yieldingly pressing the cross-wire toward the winders during the winding operation.

33. In a machine for making wire fencing, the combination with means for suitably supporting the strand-wires, and cross-wire winders slotted to receive the corresponding strand-wires and having means for engaging and winding the cross-wires on the strand-wires, of forked members operable in a direction transverse of the length of the strand-wires for deflecting the latter laterally into alinement with the winders, and means for supplying cross-wires to the winders.

34. In a machine for making wire fencing, the combination with means for suitably supporting the strand-wires, and winders for applying the cross-wires thereto, having radial slots for receiving the strand-wires in axial alinement therewith, of a transfer slide reciprocatory in a direction transverse to the length of the strand-wires, means thereon for engaging the strand-wires and guiding them into the slots of the corresponding winders, and devices on said slide for supplying a cross-wire to the winders after the latter have received the strand-wires.

35. In a machine for making wire fencing, the combination with means for suitably supporting the strand-wires, and a set of cross-wire winders arranged in pairs, and having slots to receive the corresponding strand-wires in axial alinement therewith, of a transfer slide for each pair of winders, a pair of forks thereon arranged to engage and guide the respective strand-wires into the slots of their winders as said slide is advanced, and devices on said slide for supplying a cross-wire to the winders after the strand-wires have been centered therein.

36. In a machine for making wire fencing, the combination with means for suitably supporting the strand-wires, of a pair of winders adapted for mounting cross-wires on said strand-wires each winder of the pair having a gear thereon, a pair of racks coöperating with the pinion of its respective winder, and means for simultaneously reciprocating said racks in reverse direction.

37. In a machine for making wire fencing, the combination with means for suitably supporting the strand-wires, of a set of winders adapted for mounting cross-wires on said strand-wires, a pair of reciprocatory members coöperating alternately for simultaneously reciprocating said members in reverse directions.

38. In a machine for making wire fencing, the combination with means for suitably supporting the strand-wires, of a row of revoluble winders for mounting cross-wires on said strand-wires, a pair of reciprocatory members, each member coöperating with the alternate winders of the row, and a rotatable gear arranged between the coöperating with both members for reciprocating them simultaneously in reverse directions.

39. In a machine for making wire fencing, the combination with means for suitably supporting the strand-wires, of a row of winders for mounting cross-wires on the strand-wires, housings inclosing said winders and having apertures arranged in alinement, a pair of reciprocatory members mounted in said apertures of the housings and coöperating with the alternate winders of the row, and a rotatable gear arranged between and coöperating at its opposite sides with said members for simultaneously reciprocating them in reverse directions.

40. In a machine for making wire fencing, the combination with a set of cross-wire winders arranged in a given plane and having slots for receiving the strand-wires axially thereof, of means for deflecting the strand-wires bodily into alinement with the axes of the winders, and means for supplying cross-wires to the winders after the centering of the strand-wires.

41. In a machine for making wire fencing, the combination with a set of cross-wire winders arranged in a given plane, and constructed to receive the strand-wires axially thereof, of guides over which the strand-wires pass, the tension on the strand-wires normally holding the latter clear of the winders, and means for deflecting the strands simultaneously into axial alinement with the winders.

42. In a machine for making wire fencing, the combination with a set of cross-wire winders arranged in a given plane, and adapted to coöperate with the strand-wires, of a member coöperating with the strand-wires for deflecting them simultaneously into and out of coöperative relation with the winders.

43. In a machine for making wire fencing, the combination with a set of cross-wire winders arranged in a given plane, and adapted to coöperate with the strand-wires, of a bar coöperating with the strand-wires for moving them simultaneously into coöperative relation with the corresponding winders, devices for feeding cross-wires to the winders while the strand-wires are in coöperative relation therewith, and means for automatically returning said bar to move the strand-wires out of alinement with the winders after each winding operation has been completed.

44. In a machine for making wire fencing, the combination with a set of cross-wire winders grouped in pairs and arranged to center the strand-wires therein, of a reciprocatory transfer slide for each pair of winders adapted to receive the cross-wires and apply them to the winders, and means for supplying a single cross-wire to the slide at each operation thereof.

45. In a machine for making wire fencing, the combination with a set of cross-wire winders adapted to center the strand wires of the fencing, of a reciprocatory transfer slide adapted to apply the cross-wires to the winders, and a feed plate for supplying a single cross-wire to the slide at each reciprocation thereof.

46. In a machine for making wire fencing, the combination with the cross-wire winders for applying the cross-wires to the strand-wires of the fencing, of a transfer member for supplying the cross-wires to the winders, and a feed plate controlled by the operation of said member for depositing cross-wires thereon.

47. In a machine for making wire fencing, the combination with the winders for applying the cross-wires to the strand-wires, and a transfer member for advancing the cross-wires to the winders, of a feed plate arranged to support a column of cross-wires and adapted to deliver them successively to the transfer member.

48. In a wire feeding device, the combination with a movable transfer member, of a wire supply hopper, and a movable feed plate arranged to receive the wires from the hopper, and controlled in its movements by the operation of the transfer member for supplying wires to the latter.

49. In a wire feeding device, the combination with a hopper for containing a supply of wires, and a movable feed plate for controlling the flow of the wires, of a member operable in a plane transversely to the plane of movement of said plate and coöperating with the latter for controlling the discharge of wires from the feed plate.

50. In a wire feeding device, the combination with a relatively fixed supporting plate, and a reciprocatory feed plate arranged adjacent to, and adapted to support a column of wires between it and the supporting plate, of a movable transfer member arranged to operate the feed plate for successively supplying the wires to said member.

51. In a wire feeding device, the combination with a vertical supporting plate, and a vertically reciprocatory feed plate mounted adjacent thereto, said plates being adapted to receive a column of wires between them, of a movable transfer member adapted to receive the wires from said feed plate, and a cam on the transfer member arranged to coöperate with the feed plate to control the feed of the wires to the transfer member.

52. In a wire feeding device, the combination with a relatively fixed supporting plate having an aperture therein, and a movable feed plate arranged adjacent to the supporting plate, and a ledge arranged on the feed plate and adapted to support a column of wires between the supporting and feed plates, of a transfer member mounted to reciprocate through said aperture in the supporting plate, and a cam on said member arranged to coöperate with said ledge for operating the feed plate to deliver the wires successively to the transfer member.

53. In a wire feeding device, the combination with a vertical supporting plate having an aperture therein, and a vertically movable feed plate arranged adjacent to the supporting plate and having ledges thereon normally resting above said aperture in the supporting plate for supporting a column of wires between the feed and supporting plates, of a transfer member mounted to reciprocate through said aperture in the transfer plate and adapted to receive the wires from the feed plate, and a cam on said member arranged to operate the feed plate to deliver a wire to the transfer member at each operation thereof.

54. In a wire feeding device, the combination with a movable transfer member adapted to receive the wires, of a movable feed plate arranged to support a column of wires thereon, means for operating said plate to deliver a wire to said member at each operation thereof, and means for producing a yielding pressure on the wires tending to discharge them from the feed plate.

55. In a wire feeding device, the combination with a movable transfer member adapted to receive the wires of a relatively fixed supporting plate having an aperture through which said member operates, a reciprocatory feed plate mounted to operate in proximity to said plate and to support a column of wires, a portion of the feed plate being arranged to coöperate with the edge of the supporting plate adjacent to the aperture therein as a cut-off for controlling the discharge of the wires from the feed plate to the transfer member.

56. In a wire feeding device, the combination with a wire-receiving member, of a reciprocatory feed plate having means at one end for supporting a column of wires thereon, and a yielding follower arranged at the opposite end of the feed plate for maintaining a yielding pressure on the wires supported by the feed plate.

57. In a wire feeding device, the combination with a wire-receiving member, of a reciprocatory feed plate mounted in coöperative relation therewith, a ledge arranged at one end of said plate for supporting a column of wires thereon, and a spring-operated follower acting on the column of wires for pressing them against the supporting ledge on the feed plate.

58. In a wire feeding device, the combination with a wire-receiving device, of a relatively fixed supporting plate having a transverse aperture therein, a feed plate arranged to reciprocate in a plane parallel to the supporting plate, a ledge arranged at one end of the feed plate for supporting a column of wires between the feed and supporting plates, and coöperating with the edge of the supporting plate adjacent to the aperture therein as a cut-off for controlling the flow of wires from the feed plate, and a yieldingly operated follower acting on the column of wires for discharging them through said aperture.

59. In a wire feeding device, the combination with a wire-receiving device, of a hopper for containing a supply of wires, and a feed plate controlled by the wire-receiving device for receiving the wires from the hopper and supplying them to the wire-receiving device.

60. In a wire feeding device, the combination with a movable wire transfer member, of a hopper for containing a supply of wires, a run-way leading from the hopper, a reciprocatory feed plate adapted to receive and support a column of wires from the run-way and controlled in its operation by the transfer member, a cut-off on the feed plate for interrupting the flow of wires from the run-way, and a yielding follower arranged adjacent to said cut-off and serving as a yielding buffer for the wires when the feed plate is operated to cut off the flow of wires from the run-way.

61. In a wire feeding device, the combination with a wire-receiving device, of a hopper adapted to contain a supply of wires, an inclined run-way leading from the discharge of the hopper, and a feed plate for supplying the wires to the wire-receiving device adapted to receive the wires from the run-way and support them in a column in readiness to discharge onto the wire-receiving device.

62. In a wire-feeding device, the combination with a wire-receiving device, of a hopper for holding a supply of wires, a restricted run-way leading from the hopper, and a feed plate adapted to receive wires from the hopper and support them in a single column, and means for controlling the flow of the wires from the feed plate to the wire-receiving device.

63. In a wire feeding device, the combination with a suitable wire-receiving member, of a hopper for holding a supply of wires, an inclined run-way leading from the hopper, a reciprocatory agitating plate arranged in the run-way and over which the wires therein pass, and means for controlling the flow of wires from the run-way to the wire-receiving member.

64. In a wire feeding device, the combination with a suitable wire-receiving device, of a hopper for holding a supply of wires, a restricted run-way inclined downwardly from the discharge of the hopper, an agitating plate mounted in the bottom of the run-way and arranged to reciprocate longitudinally thereof, and means for controlling the flow of wires between the lower end of the run-way and the wire-receiving device.

65. In a wire feeding device, the combination with a suitable wire-receiving device, of a hopper for holding a supply of wires having an inclined bottom leading to a discharge, and an agitator projecting above the bottom of the hopper adjacent to the discharge thereof, and means for rocking said agitator to control the flow of the wires to the hopper discharge.

66. In a wire feeding device, the combination with a suitable wire-receiving device, of a hopper for holding a supply of wires and having an inclined bottom leading to a restricted discharge, an agitator embodying rocking plates having its upper and lower edges arranged to alternately project above the bottom of the hopper during the rocking movement of the agitator, the tops of the plates being oppositely inclined and serving as tracks for the passage of the wires over the agitator.

67. In a wire feeding device, the combination with a reciprocatory transfer slide, of a hopper for holding a supply of wires, means for controlling the flow of wires between the hopper and transfer slide, an agitator located in the hopper for arranging the wires in condition for discharge, and devices arranged between the transfer slide and agitator for operating the latter.

68. In a wire fence making machine, the combination with a set of cross-wire winders, of a row of reciprocatory transfer slides for supplying the cross-wires to their corresponding winders, a rock bar carried by each slide, and an operating shaft having a set of pinions thereon coöperating with the rock bars of all of the slides in the row.

69. In a wire fence making machine, the combination with a set of cross-wire winders, of a corresponding set of transfer slides, a rack bar for each slide, devices for detachably connecting each rack bar to its respective slide, and an operating shaft having a set of pinions thereon coöperating with the racks of the slides for producing simultaneous movement thereof.

70. In a machine of the character described, the combination with a set of winders arranged in fixed relation, of a corresponding set of feed devices therefor, movable bodily into and out of coöperative relation with said winders.

71. In a machine of the character described, the combination with a set of winders arranged in fixed relation, of a corresponding cross set of feed devices movable into and out of coöperative relation with said winders, and operating devices operatively connected to the feed devices irrespective of the relative adjusted positions of the feed devices and the winders.

72. In a machine of the character described, the combination with a corresponding set of winders and feed devices therefor, the winders and feed devices being adjustable in relation to each other, and operating devices for the winders and feed devices capable of operating them irrespective of the relative adjusted positions thereof.

73. In a machine of the character described, the combination with a set of relatively fixed winders, of a pivoted carrier, a set of feed devices thereon corresponding to the winders and arranged to be moved into and out of coöperative relation therewith, operating means, and devices operatively connecting the operating means and the feed devices irrespective of the relative adjusted positions of the carrier.

74. In a machine of the character described, the combination with a set of relatively fixed winders, a pivoted carrier, feed devices mounted on said carrier and arranged to be moved into and out of coöperative relation with their corresponding winders by a relative swinging movement of said carrier, a shaft journaled in the carrier for operating the feed devices and having a gear pinion thereon, a reciprocatory rack coöperating with said pinion, a cross-head having a pivotal connection with said rack arranged in axial alinement with the center of movement of said carrier, and means for operating said cross-head.

75. In a machine of the character described, the combination with a bed having a relatively fixed standard thereon, and a set of winders mounted on the standard, of a hinge post secured on the bed, a carrier having a hinge connection with said post, and arranged to swing into and out of coöperative relation with said standard, suitable feed devices mounted on said carrier for supplying material to the correspondingly arranged winders, operating shafts journaled in the carrier for operating said feed devices, each shaft having a gear thereon, a rack mounted axially of the hinge connection between the hinge post and the carrier, a cross-head guided on a stationary part of the bed, a pivotal connection between the cross-head and said rack, and means for reciprocating said cross-head.

76. In a machine for making wire fencing, the combination with a suitable bed having means for supporting the strand-wires in operative position, and devices for applying cross-wires to the strand-wires of a number equal in aggregate length to a plurality of complete transverse wires, of means for advancing the fabric after the application of each set of cross-wires a distance equal to the sum of the spaces between the cross-wires applied at each operation.

77. In a machine for making wire fencing, the combination with means for suitably supporting the strand-wires, and devices operating intermittently to apply sets of cross-wires thereto equal in aggregate length to a plurality of complete transverse wires, of feed devices for advancing the fabric during the time elapsing between the intermittent operations of the cross-wire devices.

78. In a machine for making wire fencing, the combination with a bed having suitable guides for the strand wires, of means for imparting a step-by-step movement to the strand wires, and coöperating press dies for operating on the strand wires during the periods of rest in the movement thereof.

79. In a machine for making wire fencing, the combination with suitable means for supporting the strand wires, of means for advancing the strand-wires by a step-by-step movement, and devices timed to operate during the periods that the strand wires are at rest for applying and locking the cross-wires thereto.

80. In a machine for making wire fencing, the combination with suitable guides for the strand wires, and devices for applying cross-wires thereto, of means for imparting a step-by-step movement to the strand-wires, and presses operating to secure the cross-wires to the strand-wires during the pauses in the movement of the latter.

81. In a machine for making wire fencing, the combination with means for suitably guiding and supporting the strand-wires, and devices for applying cross-wires thereto, of feed devices for advancing the fabric, and automatically timed strippers for arranging the cross-wires on the strand-wires.

82. In a machine for making wire fencing, the combination with means for suitably guiding and supporting the strand-wires, and devices for applying cross-wires thereto, of feed devices for advancing the fabric, and strippers positioned automatically to engage and properly arrange the cross-wires during the advance movement of the strand-wires.

83. In a machine for making wire fencing, the combination with means for suitably supporting the strand-wires, and devices for applying cross-wires thereto, of means for advancing the strand-wires, strippers movable in a direction transversely to the plane of movement of the fabric, and automatically timed devices for setting the strippers to engage and properly position the cross-wires on the strand-wires during the advance movement of the latter.

84. In a machine for making wire fencing, the combination with means for supporting the fabric embodying strand and cross-wires, of feed rolls coöperating with the strand-wires, strippers arranged to coöperate with the cross-wires to position them on the strand-wires, and operating means forming a positive connection between the feed rolls and the strippers for automatically timing the operation of the strippers in relation to the feed rolls.

85. In a machine for use in wire fence making, the combination with suitable means for supporting the fabric, of feed rolls coöperating with the fabric for advancing it, strippers movable in a direction transversely to the plane of advance movement of the fabric, for engaging and positioning the cross-wires of the fabric, gearing for operating the feed rolls, a reciprocatory rack coöperating with said gearing for operating the feed rolls and cams movable with said rack and coöperating with the strippers for operating them.

86. In a machine adapted for use in making wire fencing, the combination with means for suitably supporting the fabric, of feed devices for advancing the fabric, presses for fixing the cross-wires to the strand-wires of the fabric, and strippers operating during the advance movement of the fabric for arranging the cross-wires in coöperative relation with the presses.

87. In a machine adapted for use in making wire fencing, the combination with means for suitably supporting the strand wires, and devices for applying partially complete rows of cross wires thereto, of strippers for assembling the partially complete rows of cross wires.

88. In a machine adapted for use in making wire fencing, the combination with means for suitably supporting the strand wires, and devices for applying partially complete rows of cross wires thereto, of presses for fixing the cross wires to the strand wires, and strippers for assembling the partially complete rows of cross wires in alinement and in coöperative relation with the presses.

89. In a machine for making wire fencing, the combination with means for suitably supporting the strand wires, and devices for applying sets of cross wires thereto, of means for advancing the fabric step-by-step, automatically timed strippers operating during the advance movement of the fabric for assembling the cross wires, and presses timed to operate during the pauses in the movement of the fabric for fixing the cross wires on the strand wires.

90. In a machine for making wire fencing, the combination with means for suitably guiding the strand wires, and devices for applying cross wires thereto, of presses having dies for fixing the cross wires to the strand wires, and strippers having dies arranged to assemble the cross wires in rows and place them in alinement between the press dies.

91. In a machine for making wire fencing, the combination with means for suitably guiding the fabric, of means for advancing the fabric by a step-by-step movement, relatively stationary presses having dies for fixing the cross wires of the fabric to the strand wires thereof, and strippers arranged adjacent to the presses and movable in a direction transverse of the advance movement of the fabric, and means for automatically timing the operation of the strippers to coöperate with the cross wires to place them in alinement between the dies of the presses during the advance movement of the fabric, and means for operating the presses during the pause in the movement of the fabric.

92. In a machine for making wire fencing, the combination with means for suitably supporting the fabric during its processes of construction, of feed rolls adapted to receive the strand wires of the fabric between them, a reciprocatory member, and operative connections between said member and the feed rolls for imparting an intermittent rotary movement thereto.

93. In a machine for making wire fencing, the combination with means for suitably supporting the fabric, and devices arranged to operate periodically on the fabric during is formation, of feed rolls adapted to receive the strand wires of the fabric between them, a reciprocatory rack, a pinion coöperating therewith, and a ratchet clutch connecting said pinion and feed rolls for imparting intermittent advance movement to the latter.

94. In a machine for making wire fencing, the combination with a bed having a horizontal table thereon, and a vertical standard supported on the bed and having devices thereon for applying cross wires to the strand wires, of means for supporting the strands in a vertical plane in coöperative relation to the cross wire devices, feed rolls on the bed for advancing the fabric in a horizontal plane across the bed, and a guide roll journaled on the bed and having its periphery substantially tangential to the planes occupied by the fabric in passing the cross wire device and the bed.

95. In a machine for making wire fencing, the combination with a bed having a horizontal table thereon, and a vertical standard supported on the bed and having devices thereon for applying cross wires to the strand wires, of means for guiding the strand wires over the top of the standard, a guide roll arranged below the cross wire and having spaced guides thereon, feed devices arranged on the bed for advancing the fabric over the bed in a horizontal plane, and a driving connection between the feed and guide rolls for maintaining a given ratio of speed on their peripheries.

96. In a machine for making wire fencing, the combination with a bed having a standard thereon, and a set of devices for applying cross wires to the fabric, of strand wire guides arranged above and below the cross wire devices, feed devices for intermittently advancing the strand wires under tension, and devices operable during the pause in the feed movement of the strand wires for positioning them in coöperative relation with the cross wire devices.

97. In a machine for making wire fencing, the combination with a bed, means for guiding the strand wires thereon, and devices for applying cross wires to the strand wires, the relative arrangement of the guides serving to hold the fabric in a different plane from the cross wire devices, of devices for supplying cross wires to said devices, and means for moving the strand wires into coöperative relation with said cross wire devices.

98. In a machine for making wire fencing, the combination with a set of cross wire winders arranged in a given plane, guides coöperating with the strand wires and normally tending to deflect the strand wires from the plane of the winders, of reciprocatory feed devices operable in directions transverse of the plane occupied by the strand wires, and devices operating simultaneously with the cross wire feed devices for moving the strand wires into coöperative relation with the cross wire winders.

99. In a wire feeding device, the combination with the coöperatively arranged feed rolls, and a driving shaft suitably connected to the rolls, of a gear loosely mounted on said shaft, a reciprocatory rack coöperating with said gear, and an automatic clutch for operatively connecting the said shaft and gear when the latter rotates in a given direction.

100. The combination with a wire-working machine having a step-by-step feed for the wire, of continuously operating feed devices for supplying wire to the machine, and devices for controlling the feeding operation of the feed devices according to the feed of the machine.

101. The combination with a wire working machine having an intermittent feed for the wire, of continuously operating feed devices for supplying wire to the machine, and devices for automatically controlling the feeding operation of the feed devices according to the tension of the wire between the machine and the feed devices.

102. The combination with a wire working machine having an intermittent feed for advancing the wire through the machine, of continuously operating feed devices for supplying wire to the machine, devices for automatically controlling the feeding operation of the feed devices according to the amount of slack wire between the machine and the feed devices.

103. The combination with a wire working machine embodying feed mechanism for advancing the wire through the machine by a step-by-step movement, of continuously operating feed rolls for supplying wire to the machine, and devices for automatically controlling the feeding operation of said roll to maintain a given amount of slack in the wire between the machine and the feed rolls.

104. The combination with a wire working machine embodying feed mechanism for advancing the wire through the machine with an irregular movement, of continuously operating feed rolls for supplying the wire to the machine, tension devices coöperating with the wire at a point between the machine and the feed rolls, and means operated by said tension devices for controlling the wire feeding operation of the feed rolls.

105. The combination with a wire working machine embodying feed devices for advancing the wire through the machine with an irregular movement, of continuously driven feed rolls movable relatively to each other to engage and disengage the wire leading to the machine, tension devices coöperating with the wire at a point between the machine and the feed rolls, and a controlling member operated by the tension devices for relatively adjusting the feed rolls to control the wire feed therethrough.

106. A winding drum or reel embodying a pair of segmental sections each having a pair of spaced hinge lugs at one end, and a hinge pin extending through said lugs to permit relative pivotal movement of the sections, and serving as a handle for the handling of the reel.

107. A winding drum or reel embodying segmental sections suitably connected at one end, a sleeve detachably fitted over the opposite ends of said sections, and a locking member passing through the sleeve and engaging between the sections for expanding the latter within the sleeve.

108. A winding drum or reel embodying segmental sections suitably connected at one end and having recesses formed in their longitudinal edges adjacent their unconnected ends, a sleeve adapted to detachably receive the unconnected ends of the sections, and a wedge bolt engaging in the said notches of the sections for expanding and locking the latter in the said sleeve.

109. A winding drum or reel embodying a pair of sections connected at their ends, and means for reinforcing the sections at intermediate points.

110. A winding drum or reel embodying a pair of sections capable of being collapsed to permit its removal from a winding of fabric or the like, and an adjustable cam serving as a reinforcement for the intermediate portions of the sections, and capable of being adjusted to permit collapsing of the members.

111. A winding drum or reel embodying a pair of segmental sections, a hinge connecting the sections at one end of the reel, a locking device for detachably securing the opposite ends of the sections, and a reinforcement for preventing relative proximating movement of the sections at points intermediate their ends.

112. The combination with a fabric working machine, of a winding drum for receiving and reeling the fabric therefrom, an operating shaft for the drum, a detachable driving connection between the said shaft and one end of the drum, and an open bearing supporting the free end of the drum.

113. In a machine for making a wire fencing comprising a plurality of longitudinally extending strand wires and cross wires connecting them, the combination with means for supporting the strand wires, and winders adapted to receive the latter and apply cross wires thereto, of a plurality of hoppers each adapted to contain cross wires previously cut to the required length, means for feeding said cross wires from the hoppers to the winders coöperating with each pair of adjacent strand wires, said means also operating to insert the strand wires in the winders, and means for operating the winders.

WILLIAM P. RANDALL.

Witnesses:
CLARENCE A. BATEMAN,
RUSSELL B. GRIFFITH.